US012011700B2

(12) United States Patent
Gilet et al.

(10) Patent No.: US 12,011,700 B2
(45) Date of Patent: Jun. 18, 2024

(54) MICROFLUIDIC MODULE FOR CO-ENCAPSULATION IN DROPLETS

(71) Applicant: Université de Liège, Liège (BE)

(72) Inventors: Tristan Gilet, Boncelles (BE); Stéphanie Van Loo, Beaufays (BE)

(73) Assignee: Universite De Liege, Liege (BE)

( * ) Notice: Subject to any disclaimer, the term of this patent is extended or adjusted under 35 U.S.C. 154(b) by 787 days.

(21) Appl. No.: 17/269,460

(22) PCT Filed: Jul. 4, 2019

(86) PCT No.: PCT/EP2019/068004
§ 371 (c)(1),
(2) Date: Feb. 18, 2021

(87) PCT Pub. No.: WO2020/038644
PCT Pub. Date: Feb. 27, 2020

(65) Prior Publication Data
US 2021/0237017 A1   Aug. 5, 2021

(30) Foreign Application Priority Data
Aug. 24, 2018   (EP) .................................... 18190745

(51) Int. Cl.
*B01L 1/00*     (2006.01)
*B01F 23/41*    (2022.01)
*B01F 33/301*   (2022.01)
*B01F 33/302*   (2022.01)
(Continued)

(52) U.S. Cl.
CPC .............. *B01J 13/08* (2013.01); *B01F 23/41* (2022.01); *B01F 33/301* (2022.01);
(Continued)

(58) Field of Classification Search
None
See application file for complete search history.

(56) References Cited

U.S. PATENT DOCUMENTS 9,821,312 B2 *  11/2017  Esmail ................... B01L 7/525
2011/0053798 A1   3/2011  Hindson et al.
(Continued)

FOREIGN PATENT DOCUMENTS

CN      103648648 A      3/2014
CN      104571152 A      4/2015
(Continued)

OTHER PUBLICATIONS

European Patent Office, Extended European Search Report received for Application No. 18190745.2, dated Dec. 6, 2019, 8 pages, Germany.
(Continued)

*Primary Examiner* — Jyoti Nagpaul
(74) *Attorney, Agent, or Firm* — Alston & Bird LLP

(57) ABSTRACT

A microfluidic module for co-encapsulation in droplets of two populations of particles may include first and second modules for sorting the two populations. The modules may have their first outlets including first obstructive valves configured to at least partially obstruct the first outlets. The first outlets may be fluidly connected to a fusion module, including a fusion module means for merging at least one droplet from the first droplet population and at least one droplet from the second droplet population into a merged droplet comprising the two population of particles, and a control unit for controlling the first obstructive valves from information originating from a first and second module detection portion located upstream of the first outlets.

17 Claims, 10 Drawing Sheets

(51) Int. Cl.
- *B01F 35/214* (2022.01)
- *B01F 35/221* (2022.01)
- *B01F 35/71* (2022.01)
- B01J 13/08 (2006.01)
- *B01F 101/23* (2022.01)

(52) U.S. Cl.
CPC ........ *B01F 33/3021* (2022.01); *B01F 35/214* (2022.01); *B01F 35/2211* (2022.01); *B01F 35/71805* (2022.01); *B01F 23/4143* (2022.01); *B01F 23/4145* (2022.01); *B01F 2101/23* (2022.01)

(56) References Cited

U.S. PATENT DOCUMENTS

| | | |
|---|---|---|
| 2012/0258487 A1 | 10/2012 | Chang et al. |
| 2014/0196856 A1 | 7/2014 | Bonacini |
| 2016/0051958 A1 | 2/2016 | Kung et al. |
| 2016/0231324 A1 | 8/2016 | Zhao et al. |
| 2018/0056294 A1 | 3/2018 | Di Carlo et al. |
| 2018/0133715 A1 | 5/2018 | Craig et al. |

FOREIGN PATENT DOCUMENTS

| | | |
|---|---|---|
| CN | 106732223 A | 5/2017 |
| CN | 107970847 A | 10/2020 |
| WO | WO 2011/090396 A1 | 7/2011 |
| WO | WO 2014/085802 A1 | 6/2014 |
| WO | WO 2014/151658 A1 | 9/2014 |
| WO | WO 2016/020414 A1 | 2/2016 |
| WO | WO 2016/193758 A1 | 12/2016 |
| WO | WO 2017/048975 A1 | 3/2017 |

OTHER PUBLICATIONS

Chen, Xiaoming and Ren, Carolyn L., "A microfluidic chip integrated with droplet generation, pairing, trapping, merging, mixing and releasing", RSC Adv., Mar. 16, 2017, pp. 16738-16750, vol. 7, Royal Society of Chemistry, UK.

Chung, Meng Ting, et al., "Deterministic droplet-based co-encapsulation and pairing of microparticles via active sorting and downstream merging", Lab on a Chip, Jan. 1, 2017, pp. 3664-3671, vol. 17, No. 21, Royal Society of Chemistry, UK.

Churski, Krzysztof, et al.; "High-throughput automated droplet microfluidic system for screening of reaction conditions", Lab on a Chip, Feb. 16, 2010, pp. 816-818, vol. 10, No. 7, Royal Society of Chemistry, UK.

International Searching Authority, International Search Report and Written Opinion received for International Application No. PCT/EP2019/068004, dated Aug. 26, 2019, 10 pages, European Patent Office, Netherlands.

* cited by examiner

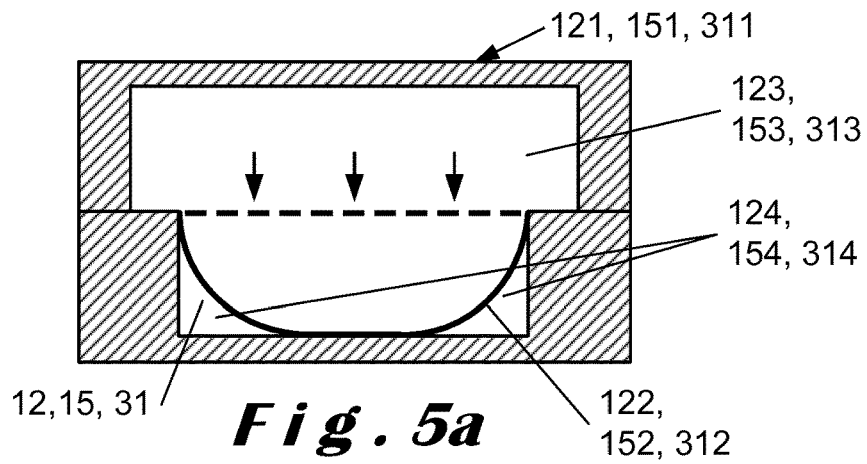
*Fig. 5a*
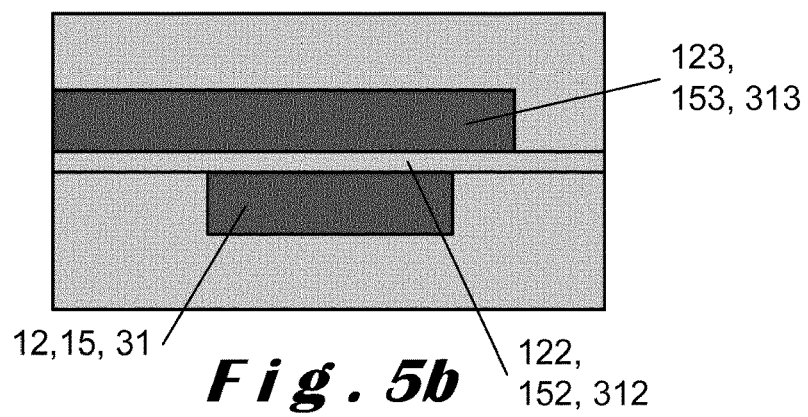
*Fig. 5b*
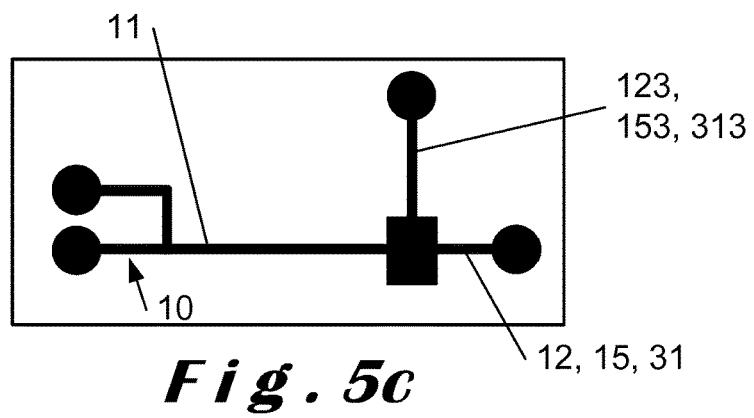
*Fig. 5c*
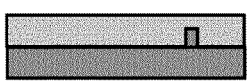 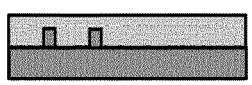  
*Fig. 6a*   *Fig. 6b*   *Fig. 6c*   *Fig. 6d*
 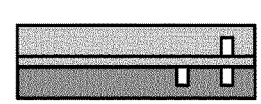
*Fig. 6e*   *Fig. 6f*

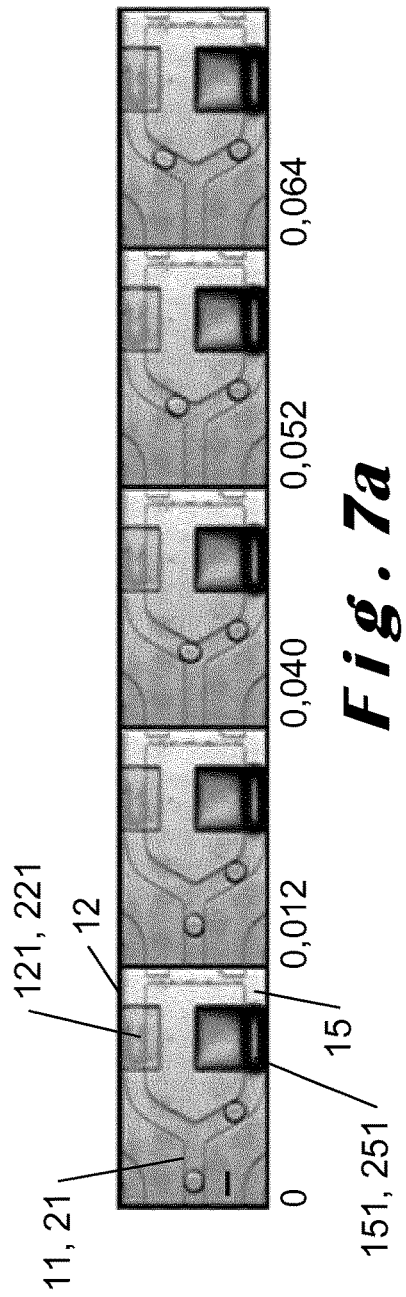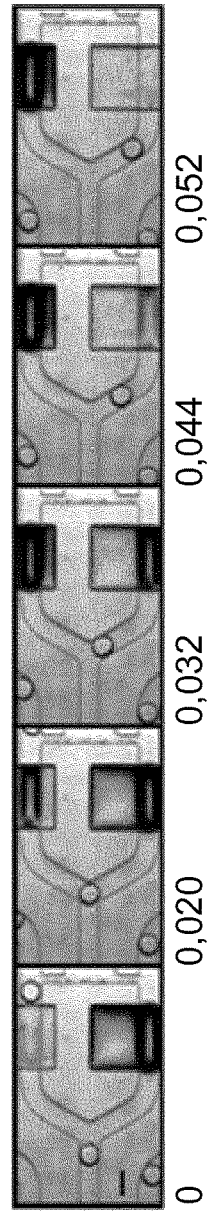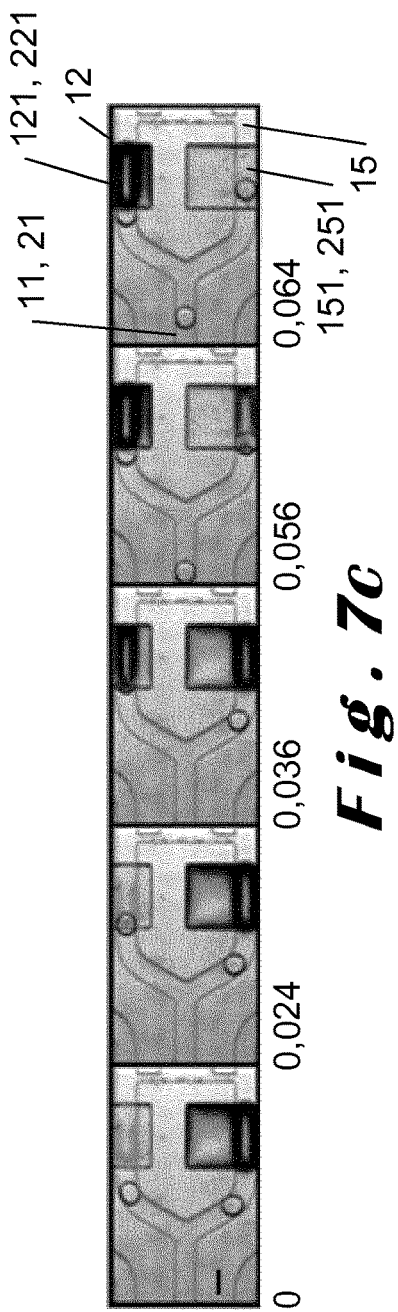

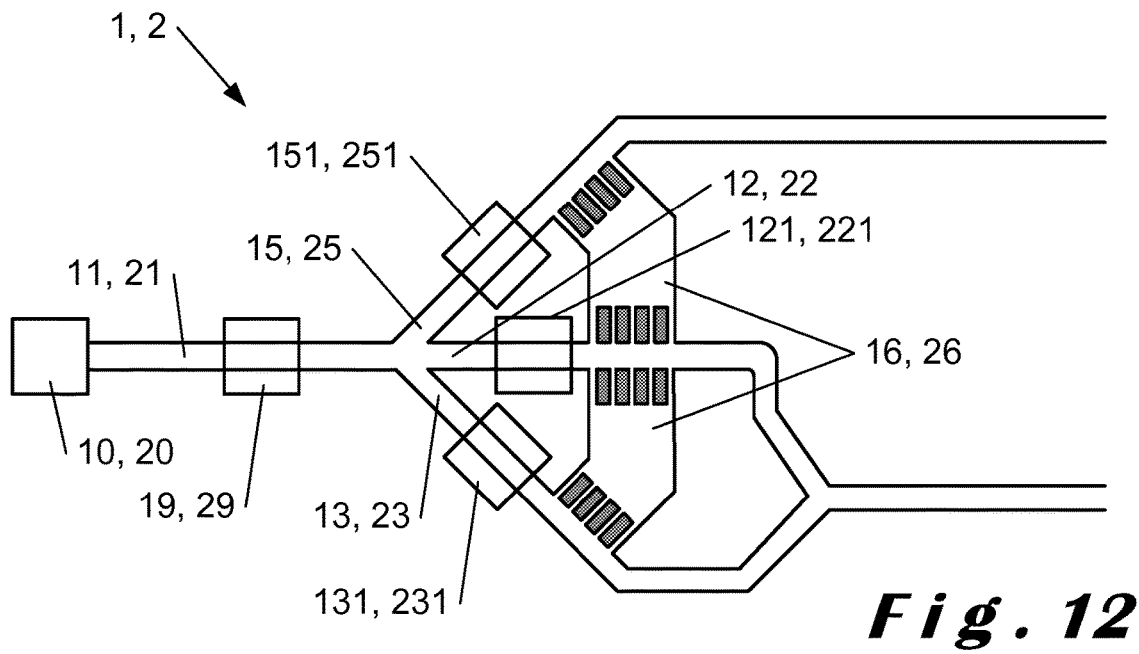
Fig. 12
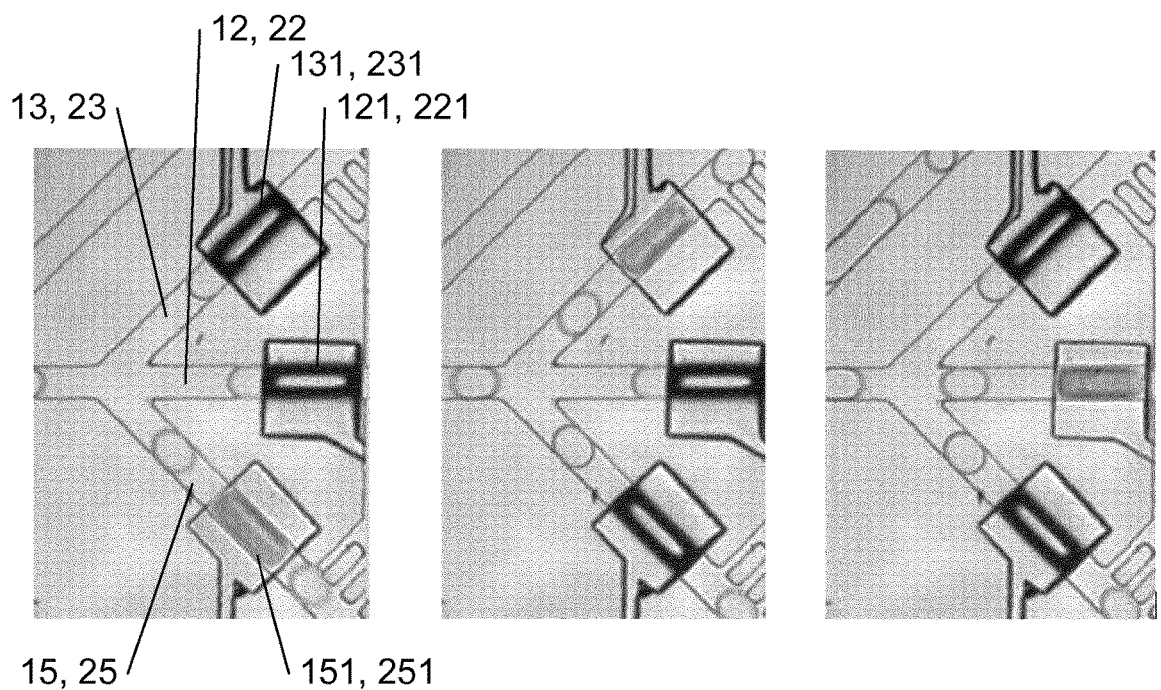
Fig. 13a  Fig. 13b  Fig. 13c

MICROFLUIDIC MODULE FOR CO-ENCAPSULATION IN DROPLETS

CROSS-REFERENCE TO RELATED APPLICATIONS

This application is a national stage application filed under 35 U.S.C. § 371 of International Application No. PCT/EP2019/068004 filed Jul. 4, 2019, which application claims priority to European Application No. 18190745.2 filed 24 Aug. 2018, each of which is hereby incorporated by reference in its entirety.

TECHNICAL AREA

According to a first aspect, the invention relates to a microfluidic module for co-encapsulation in droplets.

PRIOR ART

Microfluidics is the manipulation of fluids at the micrometre scale, in dedicated devices referred to in general as microfluidic chips. It is particularly well adapted to research and development in biology- and chemistry-related fields. Droplets of volume as small as a few picoliters can be produced in a microfluidic chip thanks to the immiscibility of two liquids, such as oil and water for instance. Aqueous droplets can be produced in an immiscible continuous oil phase (water-in-oil droplets). Reciprocally, oil droplets could be formed in an aqueous phase (oil-in-water droplets). The field that consists in creating and using droplets in microfluidics is referred to as droplet microfluidics, also referred as two-phases, segmented, or droplet-based microfluidics. Monodisperse droplets (i.e. with same volume, spacing and frequency) are created at a junction of microchannels where the two immiscible phases encounter. They are produced up to thousands per second. Droplets are conveyed in microchannels in which they can be manipulated, incubated, and observed. Each droplet acts as a micro reaction chamber with its own micro-environment or as a displacement carrier.

Droplet-based microfluidics has now become a standard platform for high-throughput single-cell experimentation and analysis. A key requirement of single-cell is to isolate one and only one cell in each droplet. Existing droplet microfluidic systems allow cell encapsulation in droplets. However, the loading of the cells inside droplets is a random Poisson process that generates at least $(1-e^{-1})=63\%$ of unwanted droplets, namely empty droplets or droplets containing more than one cell. Moreover, when co-encapsulation of at least two particles from distinct populations of objects in the same droplet is required, the proportion of droplets containing exactly one object of of each type is only equal to $e^{-2}=14\%$.

Co-encapsulation is for example needed for single-cell sequencing where one cell has to be co-encapsulated with one micro-particle serving as identification means. If the co-encapsulation is not done properly, there is a waste of cells and/or micro-particles identification means, and therefore of efficiency, rare cells, etc. This can go as far as invalidating all manipulation if the cells are too rare and their sequencing is not allowed due to lack of sufficient DNA.

Chung et al. 2017, "Deterministic droplet-based co-encapsulation and pairing of microparticles via active sorting and downstream merging", Lab Chip, 2017, 17, 3664-3671, describe the sorting and merging on the basis of a selection criterion (fluorescence or light scattering) of two populations of encapsulated cells. The sorted drops are stored in a chip, where each drop is immobilized thanks to a buoyancy trapping with micro-cavities at the top of the chip channel. The two droplet populations must be of different sizes, so that exactly one drop of each population will dock at the anchor consisting of a large and a small adjacent cavity (one for each drop size). Then the emulsion is destabilized by the addition of a chemical agent, and the anchored drops fuse. A drawback of this co-encapsulation merging unit is that the droplets size must be related to the micro-cavities traps sizes.

Chen and Ren 2017: "A microfluidic chip integrated with droplet generation, pairing, trapping, merging, mixing and releasing", RSC Adv., 2017, 7, 16738, describe a microfluidic device that is able to generate droplets, pair, trap, merge, mix and release two streams of droplets with reagents. Their design is based on a double trapping chamber able to trap one droplet from each droplet population produced and to merge them and mix their content into a merged droplet. Several double trapping chambers are put in series (up to 4). When a first trapping chamber is occupied by one couple of droplets, next droplets flow to the next trapping chambers. When all structures are occupied by merged droplets, the flows are stopped and then a higher pressure is applied in one of the outlets in order to wash out the merged droplet through the other outlet. A drawback of this microfluidic chip is that it does not allow a good control of the content of the droplets to be merged and thus of the content of the merged droplets. Another drawback is that the merged droplets are washed out from one of the outlet, which means that there cannot be a continuous merging process with this microfluidic chip.

US 2016/051958 A1 describes a droplet-merging module with droplet generators for generating droplets in a common channel. A lateral pneumatic valve coupled to a structure with micro-pillars allows the control of the number of fused droplets in this structure. The activation of the lateral pneumatic valves allows controlling the section of passage of the droplets in order to fuse from two to more than fifteen droplets. The lateral valve has a constrictive effect on the passage section of the droplets downstream of the pillars. The device allows merging droplets formed consecutively into said common channel. A drawback of this droplet merging module is that is does not allow a good control of the content of the merged droplets because it does not allow to sort generated droplets before they reach the droplet merging module. US2012/0258487 A1 describes a droplet generation and encapsulation module with inlet channels that are in fluid communication with a fusion module, wherein all droplets formed are intended to be combined.

SUMMARY OF THE INVENTION

According to a first aspect, one of the objects of the present invention is to provide a microfluidic module in order to avoid merging of droplets with unwanted or no content. The present invention allows for co-encapsulation in droplets with a high yield from two populations of encapsulating droplets. Another object of the invention is to provide a microfluidic module for co-encapsulation in droplets with encapsulating droplets of different sizes. Another object of the invention is to provide a microfluidic module for co-encapsulation in droplets allowing a high throughput with a high flexibility regarding the number of co-encapsulated droplets.

To this end, the inventors suggest a microfluidic module for co-encapsulation in droplets of two populations of particles, comprising:
- a first module comprising:
  - a first module inlet for directing a first droplet population and comprising a first module detection portion for detecting said first droplet population inside said first module inlet,
  - a first outlet of said first module in fluid communication with said first module inlet, allowing directing said first droplet population along a first outlet trajectory of said first module and comprising a first obstructive valve of said first module configured to at least partially obstruct said first outlet of said first module,
  - a first module waste outlet in fluid communication with said first module inlet and with said first outlet of said first module, allowing directing a first population droplet along a first waste trajectory of said first module;
- a second module comprising:
  - a second module inlet for directing said second droplet population and comprising a second module detection portion for detecting said second droplet population inside said second module inlet,
  - a first outlet of said second module in fluid communication with said second module inlet, allowing directing said second droplet population along a first outlet trajectory of said second module and comprising a first obstructive valve of said second module configured to at least partially obstruct said first outlet of said second module,
  - a second module waste outlet in fluid communication with said second module inlet and with said first outlet of said second module, allowing directing a second population droplet along a second module waste trajectory;
- a fusion module comprising:
  - a fusion module inlet in fluid communication with said first outlet of said first module and with said first outlet of said second module allowing directing first and second population droplets along a fusion inlet trajectory,
  - a fusion module means for merging at least one droplet from the first droplet population and at least one droplet from the second droplet population into a merged droplet,
  - a fusion module outlet in fluid communication with said fusion module inlet allowing said coalesced droplet to be released from said microfluidic module;
- a control unit for controlling:
  - said first obstructive valve of said first module from information originating from said first module detection portion,
  - said first obstructive valve of said second module from information originating from said second module detection portion.

Preferably, the first module comprises means for supplying a first droplet population encapsulating a first particle population to said first module inlet. Preferably, the second module comprises means for supplying a second droplet population encapsulating a second particle population to said second module inlet.

The microfluidic module of the invention allows the sorting of two populations of droplets by using obstructive valves, preferably pneumatically actuated. The obstructive valves used in the present invention allow to at least partially obstruct outlets in order to allow a control of the trajectory of droplets in said outlets by at least partially obstructing some outlets.

The obstructive valve used in the present invention also allows for preventing droplets to flow to an outlet being at least partially obstructed, preferably being obstructed. In the case an outlet channel is partially obstructed or obstructed by the obstructive valve of the invention, a droplet would preferably flow to an outlet channel having less resistance, for example a waste outlet or a second outlet. An obstructive valve able to partially obstruct an inlet and/or an outlet is able not to obstruct at all an inlet and/or an outlet and also to obstruct completely an inlet and/or an outlet.

With the microfluidic module of the invention, the storage of droplets is done at the same time as sorting: several branches/outlets can each store a sorted drop. For example, several branches/outlets may be a first outlet and a waste outlet. When the sorting modules each have a sorted droplet available, these two droplets are released to the fusion module. The deterministic co-encapsulation of two particle populations in droplets can only be "one-to-one"/optimal (i.e. exactly co-encapsulate one particle of each kind) if the number of particles to be matched is comparable in both initial populations. If one of the populations is under-represented, the other population will inevitably be wasted. It is therefore preferable/recommended to adjust the concentration of particles in both populations before co-encapsulation. The microfluidic module of the invention allows such adjustment by providing two distinct droplet generation and encapsulation modules that are fluidly connected to the sorting and fusion module.

The sorting droplet storage module consists of a multiple junction with outlets having obstructive valves.

Characteristics of the outlets of the first and second module of the invention:
- a Y junction with (minimum) 2 outlets, an obstructive valve on at least each outlet (for storing and sorting). An obstructive valve may also be present on the waste outlet, but is not essential;
- the design and manufacture of the obstructive valves typically have a rectangular section, with an outlet width=100 μm, outlet height=34 μm, said outlet height being equal to ⅓ of said channel width. Preferably the obstructive valve length is equal to 3 times the outlet width. The valve length is at least as long as the channel width.

Another advantage of the present invention is that it does not rely on an electric field for sorting droplets. This is a major improvement in the field of droplet cell encapsulation, because electrophoretic and dielectrophoretic sorting of droplets can be harmful for the droplet load such as living cells. The invention allows cell-encapsulated droplets to be manipulated without risk of damaging the cell content such as living cells.

Moreover, the first and second modules and their buffer zones taken independently or in combination, of the microfluidic module of the invention allow for sorting droplets, slowing down droplets and blocking droplets, for example for selection of droplets based on their content, for retention or incubation of a droplet content.

An advantage of the invention is to allow blocking a droplet in an outlet or in a buffer zone before the droplet reaches the fusion module. In this way, the yield of co-encapsulated droplets can be enhanced because the droplets sent to the fusion module are sent at the right time and with a validated content. In an embodiment where no buffer zone is present, the waste outlet may be used as an outlet to store a droplet while waiting for the second population.

The microfluidic module for droplet manipulation according to the invention features other advantages such as sorting droplets based on droplet content, droplet load, morphology of the droplet or its content, droplet shape, droplet size, droplet color, etc.

A pneumatic valve used in the microfluidic module for droplet manipulation does not involve any electric field, and therefore no electrostatic effect influencing the behaviour of the biological contents of the droplets (for instance cells and proteins that are encapsulated in). Pneumatic valves make it possible to block the droplets in the microchip, in particular for incubation, for prolonged incubation or for drainage. For example the pneumatic control means is activated by an operator based on the image viewed in said visualisation portion.

An obstructive pneumatic valve is a valve that allows the opening or closing of a channel depending on an air pressure in a control channel. An obstructive pneumatic valve also allows to reach intermediate obstruction states such as to allow a controlled opening of an outlet channel by applying an air pressure in a control channel that is intermediate between an open valve pressure and a closed valve pressure. An obstructive valve can provide a complete obstruction of an outlet channel as well as it can provide a partial obstruction of an outlet channel or a full opening of an outlet channel.

Preferably, said inlet and first outlet channels both have cross-sections presenting a first extension along a first direction that is smaller than a second extension along a second direction perpendicular to said first direction, said first and second directions being perpendicular to the trajectories imposed by said inlet and first outlet channels. The obstruction of the outlet channel by the obstructive valve is possible when the cross-section width is at least equal or larger than the height. For example the deflectable wall of the obstructive valve allows a deflection regime with the collapse of the deflectable wall to the bottom of the outlet channel. Gutters are then left on the sides of the channel where the continuous phase can still flow.

Preferably, said detection portion allows optical visualisation or optical detection, and/or electrical detection, and/or magnetic detection and/or electromagnetic detection of droplets and/or droplet content. For example optical visualisation is done with visible light or with spectroscopic tools using UV, IR wavelengths. For example electrical detection is a detection based on a capacitive measurement which is able to detect a change of dielectric constant of a droplet and/or droplet content. For example a magnetic detection is a detection of magnetic compounds in droplets and/or in droplet content. For example, electromagnetic detection is detection using interaction of high energy photons such as X-ray.

For example, it is possible to have a first module and a second module with inlet and outlet cross-sections of different shape and dimensions. Visualizing a displacement of a droplet inside an inlet channel can also be understood as visualizing a non-displacement of a droplet or a droplet being immobilized within the visualisation portion. The microfluidic device of the invention allows the manipulation of a droplet based on an optical signal from said droplet. The pneumatic obstructive valve can be controlled based on an optical signal of a droplet detected from said detection portion.

Advantages of the present invention compared to other fusion/co-encapsulation modules:
co-encapsulation with pre-sorting makes it possible to do better than random co-encapsulation (without sorting, by bringing the two populations into a single drop formation junction) for which the rate of co-encapsulation is strictly less than 14%;
thanks to the buffer zones, the microfluidic device has the ability to fuse the droplets «on-the-fly»/directly after sorting, instead of merging in a second device with less retention/pairing efficiency. This allows less manipulations, more efficiency (>92%) of co-encapsulation, in particular regarding Chung et al. 2017;
the number of fused droplets is unlimited, compared to a limited number of trapping sites used for co-encapsulation by buoyancy trapping, this is particularly relevant regarding Chung et al. 2017;
the microfluidic device is not sensitive to the size of the droplets. It can be adapted to the fusion of droplets of the same size or of different dimensions. Unlike Chung et al. 2017 who can only merge droplets of dimension sufficiently distinct to hang specifically anchors;
there is no need to validate/observe the fusion/merging of two droplets from two populations. Once the droplets are stored and released to the fusion module, the fusion is ensured to 100% thanks to the control by obstructive valves (robustness regarding the size of the droplets and tolerance on the size of the fused drops). The merging/fusion is deterministic, unlike fusion modules with anchoring site, where occupation by the droplets to be fused is non-deterministic, and requires more droplets than anchoring sites.

In terms of performance, the co-encapsulation speed can be limited by the frequency of activation of the obstructive valves. This is function of the pneumatic control means used, for example a response time of the order of 4 ms, limiting to 250 droplets/s and the analysis of the droplet content (by image analysis, tested on 150 droplets per second, higher rate of image analysis is foreseen). Analysis of droplet content can also be performed thanks to photodetector and reach detection rate higher than 1 kHz.

Any fusion module means may be used in said fusion module. A fusion module means can be passive (such as with bifurcations, constrictions etc.) or active (with external means such as electric field, blocking with obstructive valve, heat, etc.).

In a passive fusion module means, two droplets are brought close to each other (or paired, synchronized) in a common channel or chamber, then their coalescence is induced by collision of both droplets at low capillary number (Ca<1), for example in a Y junction or cross-shaped junction where the two droplets meet. Another widely used geometry is a widening chamber followed by a narrower channel: the droplet velocity decreases in the widening channel because of drainage of the continuous phase, then it increases again at the entry of the narrow channel, allowing two consecutive droplets to come close enough together to coalesce. An alternative is a widening channel with an array of pillars to drive the droplets in the centre, while the continuous phase drains out of the pillars. Passive means typically require no surfactant use, even if passive merging of surfactant-stabilized droplets has also been demonstrated (Mazutis 2009). Preferably, one uses surfactant and achieves controlled merging with active means such as
driven by DC or AC electric field (=electro-coalescence);
the laser-induced localized heating of two adjacent droplets, producing a depletion of the surfactant at the interfaces;

chemically induced through the addition of a destabilizing alcohol;

with obstructive valve to block a first droplet until a second droplet comes close to the first.

Preferably, said microfluidic module can be implemented on one microfluidic chip, on two chips or on a plurality of chips.

Preferably, said fusion module means is an obstructive valve configured to at least partially obstruct said fusion inlet to stop at least one droplet from the first droplet population and at least one droplet from the second droplet population and for merging said stopped droplets, and said control unit is configured for further controlling said fusion module obstructive valve from information originating from said first and second module detection portions.

Preferably, said first module further comprising:
a first generation and encapsulation module for generating first droplets and for encapsulating first particle population into said first generated droplets in order to form a first droplet population to supply to said first module inlet, and;
said second module further comprising a second generation and encapsulation module for generating second droplets and for encapsulating second particle population into said second generated droplets in order to form a second droplet population to supply to said second module inlet.

Preferably, said first module further comprising:
a second outlet of said first module in fluid communication with said first module inlet and with said first outlet of said first module, and with said fusion module inlet allowing directing said first droplet population along a second outlet trajectory of said first module toward said fusion module inlet and comprising a second obstructive valve of said first module configured to at least partially obstruct said second outlet of said first module,
said second module further comprising:
a second outlet of said second module in fluid communication with said second module inlet and with said first outlet of said second module, and with said fusion module inlet allowing directing said second droplet population along a second outlet trajectory of said second module toward said fusion module inlet and comprising a second obstructive valve of said second module configured to at least partially obstruct said second outlet of said second module, and,
said control unit being configured for further controlling:
said second obstructive valve of said first module from information originating from said first module detection portion,
said second obstructive valve of said second module from information originating from said second module detection portion.

Preferably, said microfluidic module comprises N outlets per modules (for sorting and buffering). Said N outlets comprising similar features than said first and second outlets described above such as obstructive valve and fluid connexion to the fusion module. N being an integer with values comprised between 2 and 100. For example N equals 3, 4, 5, 6, 7, 8, 9, or 10.

Preferably, said fusion module further comprising a fusion module chamber surrounding at least partially said fusion module inlet and said fusion module obstructive valve, said fusion module chamber and said fusion module inlet being separated by a plurality of micro-pillars to create fluid communications able to drain a droplet carrier fluid of said first and second droplet populations from said fusion module inlet to said fusion module chamber. More preferably, said fusion module chamber is in fluid communication with said fusion module outlet.

Preferably, said first and second population droplets having first and second droplets diameters; said plurality of micro-pillars forming a micro-pillar array with micro-pillars being spaced with an inter pillar-spacing being lower than said first and second droplets diameters, preferably, said inter pillar-spacing ranging from 0.1 μm to 1000 μm and even more preferably ranging from 1 μm to 100 μm. More preferably, said inter-pillar spacing dimension should be smaller than the droplet width/diameter.

Preferably,
said first module further comprises a first module lateral channel to form a fluid communication between said first outlet of said first module and said first module waste outlet,
said second module further comprises a second module lateral channel to form a fluid communication between said first outlet of said second module and said second module waste outlet.

Preferably,
said first module further comprises a first module lateral channel to form a fluid communication between said first and second outlets of said first module and said first module waste outlet,
said second module further comprises a second module lateral channel to form a fluid communication between said first and second outlet of said second module and said second module waste outlet.

A lateral channel or bypass channel between outlets of first and second modules having N outlets, for example first and second outlets having a first outlet and a waste outlet, another example is between a first, a second outlet and a waste outlet, for example the lateral channel can fluidly connect N outlets. Preferably the lateral channel fluidly connects the outlets just after the obstructive valve on the outlet, if any. Preferably, the bypass channel sizing and junction is based on two conditions: first, equalizing the pressures just after the valves to make the operation of the valves independent of the output resistors (unchanged). Second, the output resistance of each outlet should be adjusted to the proportion of the total flow that it is supposed to receive, depending e.g. on the concentration of objects to be sorted and combined.

Preferably, said first module lateral channel and said first outlet of said first module and said first module waste outlet are each separated by at least two micro-pillars, more preferably at least four. Preferably, said second module lateral channel and said first outlet of said second module and said second module waste outlet are each separated by at least two micro-pillars, more preferably at least four. Preferably, said first module lateral channel, said first outlet, said second outlet of said first module, and said first module waste outlet are each separated by at least two micro-pillars, more preferably at least four. Preferably, said second module lateral channel and said first outlet of said second module and said second module waste outlet are each separated by at least two micro-pillars, more preferably at least four.

Preferably, said first outlet and said first obstructive valve of said first module form a first buffer zone for retention of a first population droplet when said valve at least partially obstructs said first outlet of said first module for buffering a first population droplet;
said first outlet and said first obstructive valve of said second module form a first buffer zone for retention of a second population droplet when said valve at least partially obstructs said first outlet of said second module for buffering a second population droplet, and;

said control unit is configured for further controlling said first obstructive valve of said first module and said first obstructive valve of said second module for buffering a first or a second population droplet inside said first buffer zone of said first or second module respectively until detection of a droplet of the non-buffered first or second droplet population from said first or second module detection portion.

Preferably, said second outlet and said second obstructive valve of said first module form a second buffer zone for retention of a first population droplet when said valve at least partially obstructs said second outlet of said first module for buffering a first population droplet;

said second outlet and said second obstructive valve of said second module form a second buffer zone for retention of a second population droplet when said valve at least partially obstructs said second outlet of said second module for buffering a second population droplet, and;

said control unit is configured for further controlling said second obstructive valve of said first module and said second obstructive valve of said second module for buffering a first or a second population droplet inside said second buffer zone of said first or second module respectively until detection of a droplet of the non-buffered first or second droplet population from said first or second module detection portion.

The number of outlets (N) or branches of the first or second module defines the number of storage areas (N−1) of the buffer zone. By increasing N, the number of buffer zones is thus increased, making it possible to remedy/compensate for an inhomogeneity of particle distribution in one or in both droplet populations. Increasing the number of buffer zones in a module allows to send less encapsulated droplets to the waste outlet of one population when droplets of the other population have a lower encapsulation rate or a more unpredictable encapsulation rate.

Modelling the probability of filling all buffer zones, depending on the particle concentration in two droplet populations and the number N of outlets or branches per module, on the losing a positive droplet for lack of available buffer zone. With N=2, (1 buffer zone), there is 30% loss (70% retention). At N=3 (2 buffer zone), losses drop to 15% (85% retention). With N=5 (4 buffer zones), losses are less than 8% (92% retention). The concentration of particles has little influence on these results. Increasing the number of buffer zones is possible but not unlimited due to congestion of a mostly two-dimensional microfluidic design. Buffer zones geometry other than a tree/branching may be considered.

In other words, for the fusion of at least two droplets coming from at least two populations, each droplet encapsulation module has to supply one droplet to the fusion module. As the arrival of the droplets to be fused (i.e. droplets with interesting content/particles/etc) is not necessarily synchronized, an interesting droplet from one population has to be stored in a buffer zone, waiting for the arrival of an interesting droplet from the second population. In an embodiment where no buffer zone is present, the waste outlet may function as a buffer zone. The obstructive valves on each outlet serve as buffer/waiting zone. With at least two outlets per inlet module, one waiting zone is available. Increasing the number of outlets increases the number of buffer/waiting zones. Any other mean for droplet buffering before fusion can also be used.

Preferably said detected droplet encapsulates a first or second particle population.

Preferably, said first module waste outlet further comprises a first module waste outlet obstructive valve configured to at least partially obstruct said first module waste outlet;

said second module waste outlet further comprises a second module waste outlet obstructive valve configured to at least partially obstruct said second module waste outlet;

said control unit is configured for further controlling:
said first module waste outlet obstructive valve from information originating from said first module detection portion,
said second module waste outlet obstructive valve from information originating from said second module detection portion.

Preferably, said first obstructive valve of said first module and said first obstructive valve of said second module, and more preferably said second obstructive valve of said first module and said second obstructive valve of said second module are pneumatically actuated obstructive valves, each comprising:
a control channel;
a deflectable wall separating said control channels and said outlets;
said deflectable walls being deflectable in response to an elevated pressure in said control channels, said deflectable walls being deflected within said outlets such that said outlets are at least partially obstructed.

Preferably said deflectable wall is deflected along a direction substantially parallel to said outlet height.

Preferably, the microfluidic further comprises pneumatic control means configured to activate said obstructive valves and more preferably, configured to also activate said obstructive valves.

Preferably, said first and second outlets in fluid communication with said inlets and with said first outlet channel, allow directing a droplet along inlet and outlet trajectories, each cross-sections along said inlet and outlet trajectories having an outlet height and an outlet width larger than said outlet height. Preferably said obstructive valves are configured to at least partially obstruct said outlets and/or waste outlet along a direction substantially parallel to said outlet height. Preferably said obstructive valves are controlled by said pneumatic control means.

An advantage of the invention is to allow performing a series of operations with droplets such as their sorting. For example, coupled to a module for droplet generation and a module for cell or particle encapsulation in the droplet, the invention allows to achieve co-encapsulation of two single-particles in one droplet with encapsulation rates close to 100% by selecting the droplets with encapsulated cells in each population and discarding the droplets without encapsulated cell. The invention hence avoids the fusion of one droplet with interesting content (i.e. one particle) with an empty droplet. Without the invention, droplets with cell encapsulated are for example obtained with only a 10% rate typically (at low dilution, to avoid multiple particle encapsulation, cf. Poisson distribution law). Preferably, there can be maximum 36% of droplets with a single cell, and that at this concentration 36% cells are empty and 28 cells contain more than one cell.

An advantage of using obstructive valves are that they do not produce a physical effect such as an electric or thermal field on the droplet and its contents. They are capable of completely blocking a droplet, which allows the immobilization of droplets for sorting, storage, incubation, agitation, merging, etc. They are robust, easy to manufacture and to include in PDMS chips or other flexible material. Finally, the response time is shorter compared to valves based on phase change. The obstructive valve is activated when the control channel is pressurized, the deflectable wall between the control channel and the outlet deflects towards the outlet (flow channel). This creates a total or partial obstruction of the outlet channel. These valves, called obstructive valves, are also called pneumatic valves, membrane valves or multilayer soft lithography (MSL) valves.

Another advantage of the obstructive valve is about the manufacture of these valves which allows for a precise control of the thickness of the deflectable wall of the valves, which ensures a predictable and reproducible behaviour of the valves, and thus of the droplets in response to their activation.

Preferably, first and second population droplets are dispersed into a continuous phase and said partially obstructed outlets are able to block said first and/or second population droplets with said deflectable wall and to let flow said continuous phase.

Preferably, inlets and outlets have an essentially rectangular cross-section perpendicularly to a droplet trajectory inside said inlets and outlets.

Preferably, said detection portion is essentially transparent for imaging droplet and/or droplet content.

Droplet content is preferably any particle, object, chemical compound or biological compound that may be loaded in a droplet. Droplet content is more preferably a cell, a living cell, a portion of cell, a protein, a microparticle, a nanoparticle, a reagent, a micro-object, a labelling agent and or any other compound. Droplet information is preferably any data about the droplet or the droplet content or the interaction between two droplets or the interaction between a droplet and its content. Droplet information is more preferably: speed of a droplet inside said inlet channel, the presence or not of some content inside said droplet, the morphology or the shape or the colour or the contrast or the size of said content, the number of objects inside said droplet, the spacing between two droplets, the frequency of droplets flowing inside said channel.

The co-encapsulation of particles and a second dispersed phase is also possible at the drop formation junction: two aqueous phase inputs, one of which contains particles and one continuous phase/oil input. Instead of a cross at the entrance (a water inlet and two oil inlets), a second water inlet can be added. This makes it possible to encapsulate a particle (coming from a first input), with a second "dispersed" phase in which there would be for example a reagent (it is know from the one skilled in the art but could be advantageously used in combination with the microfluidic module of the invention).

The valves developed for this invention have preferably rectangular cross-section, contrarily to circular or rounded cross-section valves usually met in the literature. This geometry has an important technical effect: the flow channel is not totally obstructed when the valve is deflected (FIG. 5a), gutters are present along the vertical walls. This allows the continuous phase to potentially flow whereas the droplets are potentially blocked or slowed down. It allows applications such as merging, "parking", incubation, drainage. The advantage to use rectangular cross-section valves is that they can be fabricated for example with photolithography. The round cross-section valves require a fabrication based on positive photoresist photolithography, followed by a second bake ("reflow") that melts the photoresist and makes the cross-section circular. Whereas rectangular cross-section valves require a photolithography fabrication with negative photoresist, without reflow.

Preferably, said inlets and outlets are configured for carrying an emulsion with two liquid phases comprising a first continuous phase and a second dispersed phase.

Preferably, said detection portion is essentially transparent for imaging droplet and/or droplet content.

Preferably, said partially obstructed outlet channel is able to block said dispersed phase or droplet with said deflected wall and to let flow said continuous phase.

Preferably, the microfluidic module further comprises micro-pillars along said fusion module inlet, said micro-pillars being essentially parallel to said outlet height or to said outlet width, and being upstream of said fusion module obstructive valve. An advantage of having micro-pillars is to allow coalescence of droplets upstream of an obstructive valve, the continuous phase being drained away through the micro-pillars interspacing. Then merged/fused/coalesced droplets are released to the fusion module outlet.

In a preferred embodiment, the droplet generation and encapsulation module upstream of the inlets are for example a flow focusing module or a T-junction.

Preferably, the invention comprises a module for loading/encapsulating in droplet for example a cell, a living cell, a portion of cell, a protein, a microparticle, a nanoparticle, a reagent, a micro-object, a labelling agent and or any other compound.

Preferably, the deflectable wall comprises poly(dimethylsiloxane) (PDMS).

Preferably, the microfluidic module further comprises:
a camera for providing a succession of images from said detection portion;
an image processing unit for processing said succession of images, said image processing unit being configured to determine real-time position of droplet and/or particle. Preferably, said real-time position of droplet and/or particle is determined by: identifying a droplet in said succession of images; detecting said droplet edges; calculating a centre of mass of said droplet; determining a position in said detection portion of said centre of mass as a function of time;
determining a velocity of said droplet based on the position as a function of time.

An advantage of this embodiment of the invention is to allow the analysis of droplets from the detection portion with preferably digital imaging units and processing units. This also preferably allows the analysis of droplets with high magnification, high image resolution and high time resolution. It also preferably allows positioning of optical filters and even to make use of different types of camera being sensible to different wavelength ranges.

Preferably, the invention is able to meet the limitations of FACS ("Fluorescence Activated Cell Sorter") and to complement it, especially for single-cell analysis. Unlike FACS, the invention is flexible regarding the type of cells encapsulated in droplets. The viability of the cells sorted is preserved thanks to their encapsulation in droplets. Moreover, FACS is not able to perform co-encapsulation.

The microfluidic module is preferably modular. The droplet forming, encapsulation, sorting, storage and fusion modules can be combined in series, in parallel to perform more complex operations. The image acquisition, detection and analysis modules can also be combined in parallel or in series: for example several cameras and a computer, a camera and one or more sensors (photomultiplier tube, or capacitive, magnetic sensor, acoustic) and a computer.

Preferably, the first and second outlets are downstream to said detection portion. Preferably, the invention allows carrying out several successive operations (sorting, merging, combinations) on droplets, and therefore on individual cells contained in droplets. The invention also allows visualizing phenomena in an inlet or an outlet channel, by rapid imaging of any droplet-droplet interaction or of encapsulated cell growth or development in a droplet. The invention allows responding in real time to the evolution of any cell or droplet for example. A response to the detecting portions is preferably an activation of the obstructive valves on the outlets and/or on the fusion module.

Sorting of droplets is advantageously done with a real-time vision module to analyse any droplets in an inlet. Valves are actuated in response to the vision system to operate droplet sorting and or fusion/merging.

The invention preferably makes use of real-time analysis of images of the droplet content and not of a single pixel fluorescence signal for example (that is the typical signal of a photodetector). This allows distinguishing precisely the morphology and the number of the encapsulated cells/particles/content, as well as any other feature observable by vision. Real-time image analysis allows the analysis of multiple Region-of-Interest (ROI) on the same images in parallel, independently, that is required for the sorting of two populations before fusion. Preferably the invention does not require encapsulated cells in droplets to be labelled with a fluorescent agent. Preferably the invention allows the detection of both labelled and non-labelled encapsulated cells.

Preferably, a camera is configured for providing an image of a portion of the inlet channel and more particularly at the detection portion of the inlet channel. The information is viewed, observed, seen, visualized, pictured, watched in said detection portion by the camera that provides an image of said information.

One can combine several successive sorting, merging and splitting operations, based on a single acquired image (and thus on a single optical system).

Preferably, said pneumatic control means is controlled by said image processing unit based on real-time position of droplet and/or particle.

Preferably, said image processing unit is configured to identify the encapsulated content of a first and/or second population droplet and to discriminate said first and/or second population droplet respectively based on its encapsulated content.

Preferably, encapsulated content can be no content. Therefore, a droplet with no content is considered empty and is sent to the corresponding waste outlet. Also a droplet that contains more than one particle is preferably sent to the corresponding waste outlet.

BRIEF DESCRIPTION OF THE FIGURES

These aspects of the invention as well as others will be explained in the detailed description of specified embodiments of the invention, with reference to the drawings in the figures, in which:

FIGS. 5a, b and c show cross-sections of the obstructive valve and a top view of part of a module showed in FIG. 1 according to the invention;

FIG. 6a to f show manufacturing steps for making obstructive valves for the invention;

FIGS. 7a, b and c show pictures of said first or second module for sorting taken at different time intervals in order to show the droplet evolution in said first or second module;

FIG. 12 shows an exemplary embodiment of the first and second module for sorting droplets according to the invention;

FIG. 13 shows pictures of the first or second sorting module of the invention showing droplet retention and flow depending on the state of the obstructive valves.

The drawings in the figures are not to scale. Generally, similar elements are designated by similar reference signs in the figures. The presence of reference numbers in the drawings is not to be considered limiting, even when such numbers are also included in the claims.

DETAILED DESCRIPTION OF POSSIBLE EMBODIMENTS OF THE INVENTION

Figure 1:
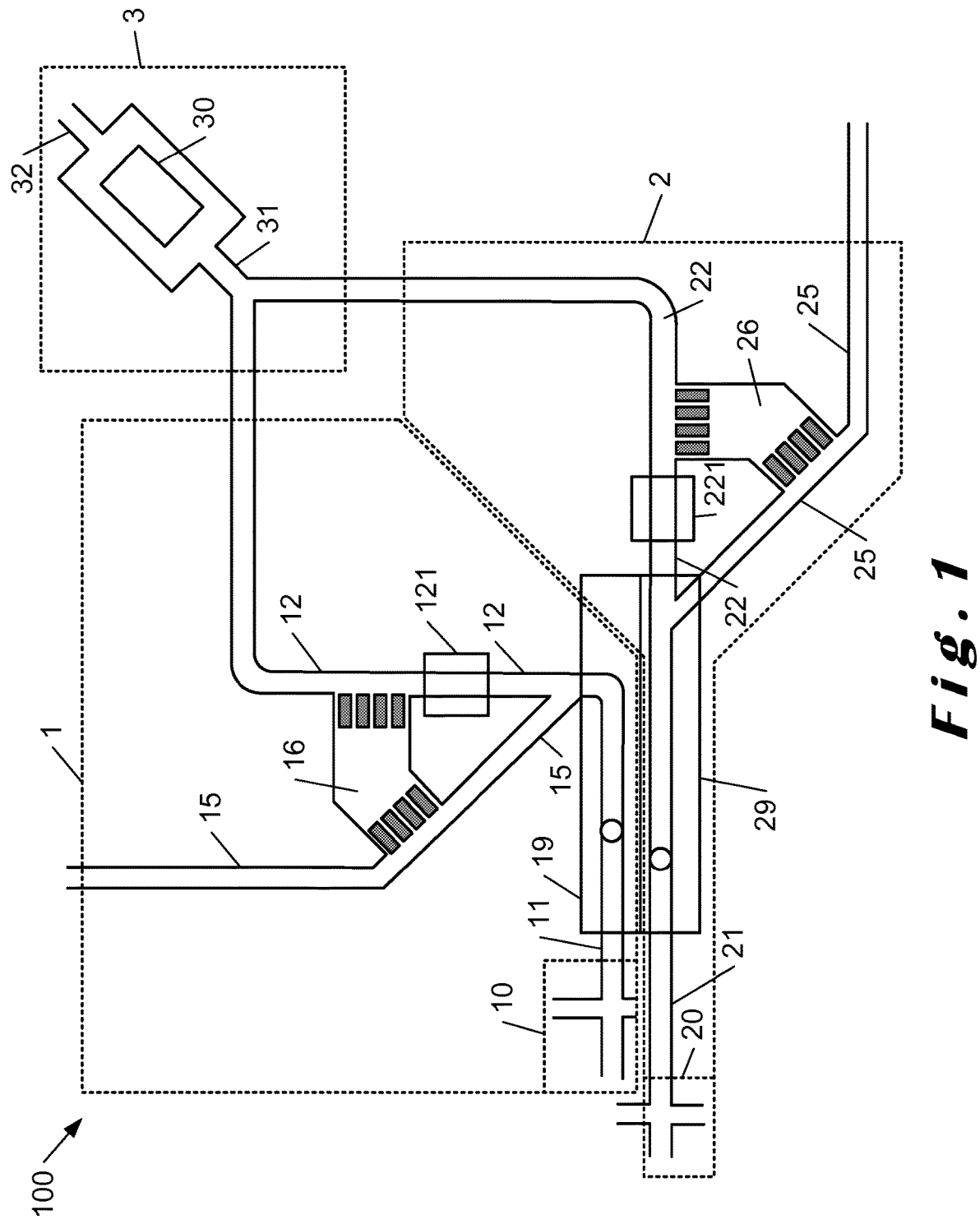
FIG. 1 shows an exemplary embodiment of the microfluidic module of the invention.

FIG. 1 shows a schematic diagram of an embodiment of the microfluidic module 100 of the invention. The microfluidic device 100 comprises a first module 1, for generating, encapsulating, sorting and providing to the fusion module 3 a droplet of a first population to be merged with another droplet in the fusion module 3. The microfluidic device 100 comprises a second module 2, for generating, encapsulating, sorting and providing to the fusion module 3 a droplet of a second population to merge with another droplet in the fusion module 3. The first 1 and second 2 modules each comprise a generation and encapsulation module 10, 20 able to provide in respective inlets 11, 21, encapsulated droplets of a first and second population respectively. The first 1 and second 2 module inlets 11, 21 respectively each have a detection portion 19, 29 which allows visualizing generated and encapsulated droplets in these inlets 11, 21. The visualization through these detection portions 19, 29 allows to control the obstructive valves 121, 221, and preferably the fusion module means 30. The control of the valves is preferably to allow directing droplets of the first and second populations having desired encapsulated content toward the fusion/merging module 3 in order to co-encapsulate said droplet of first and second populations with desired encapsulated content. To this end, FIG. 1, comprises a first outlet 12 of the first module 1 in fluid communication with the first module inlet 11 and with the fusion module 3, preferably fusion module inlet 31. The first outlet 12 of the first module 1 allows directing to the fusion module 3, droplets of the first population having the desired encapsulated content. In the case the encapsulated content or the droplet itself does not provide desired properties from the detection portion 19 (29), the droplet is directed to a first waste outlet 15 (25) which is in fluid communication with the first (second) module inlet 11 (21). The first (second) module inlet 11 (21), the first outlet 12 (22) and the waste outlet 15 (25) are fluid connected via a Y junction. A droplet is directed thanks to the obstructive valves positioned on the first outlet 12 (22). For the second module 2, the description of the first module 1 applies mutatis mutandis.

The first 1 and second 2 modules are connected to the fusion module 3 via their respective first 12, 22 outlets which converge into a fusion module inlet 31. The fusion module 3 comprises an inlet 31 onto which a fusion module means (30) is positioned. The fusion module means allows merging at least two droplets. When the two droplets are merged, leading to a co-encapsulation, the co-encapsulating droplet is released and flows to the fusion module outlet 32.

The first (second) inlet 11 (21) has a detection portion 19 (29) that allows visualizing the fluid flow within said inlet 11 (21). The detection portion 19 (29) being transparent to visible light, it allows to visualize the flow of an emulsion constituted by immiscible droplets in a continuous phase. The detection portion 19 (29) is particularly well suited for visualizing droplet movement, evolution and speed within said inlet 11 (21). The detection portion 19 (29) is particularly well suited for visualizing the content of a droplet within said inlet 11 (21). Studying of the content of a droplet as well as its speed requires preferably magnifying means such as a microscope or a lens.

In order to manipulate droplets on the basis of the observation done from the detection portion 19 (29), a first obstructive valve 121 (221) is placed on the first outlet 12 (22). The first obstructive valve 121 (221) can be activated based on any information observed from the detection portion 19 (29). An information observed, or viewed or visualized or deducted from an observation is for example about the speed of a droplet inside said inlet 11 (21), the presence or not of some content inside said droplet, the morphology or the shape or the colour or the contrast or the size of said content, the number of objects inside said droplet, the spacing between two droplets, the frequency of droplets flowing inside said channel. The first obstructive valve 121 (221) can be activated in order to slow down a droplet, to block a droplet (buffering) based on some information from the detection portion 19 (29). The inlet 11 (21) and first outlet 12 (22) are preferably designed to allow a good flow of an emulsion having droplets in a continuous phase.

Figure 2:
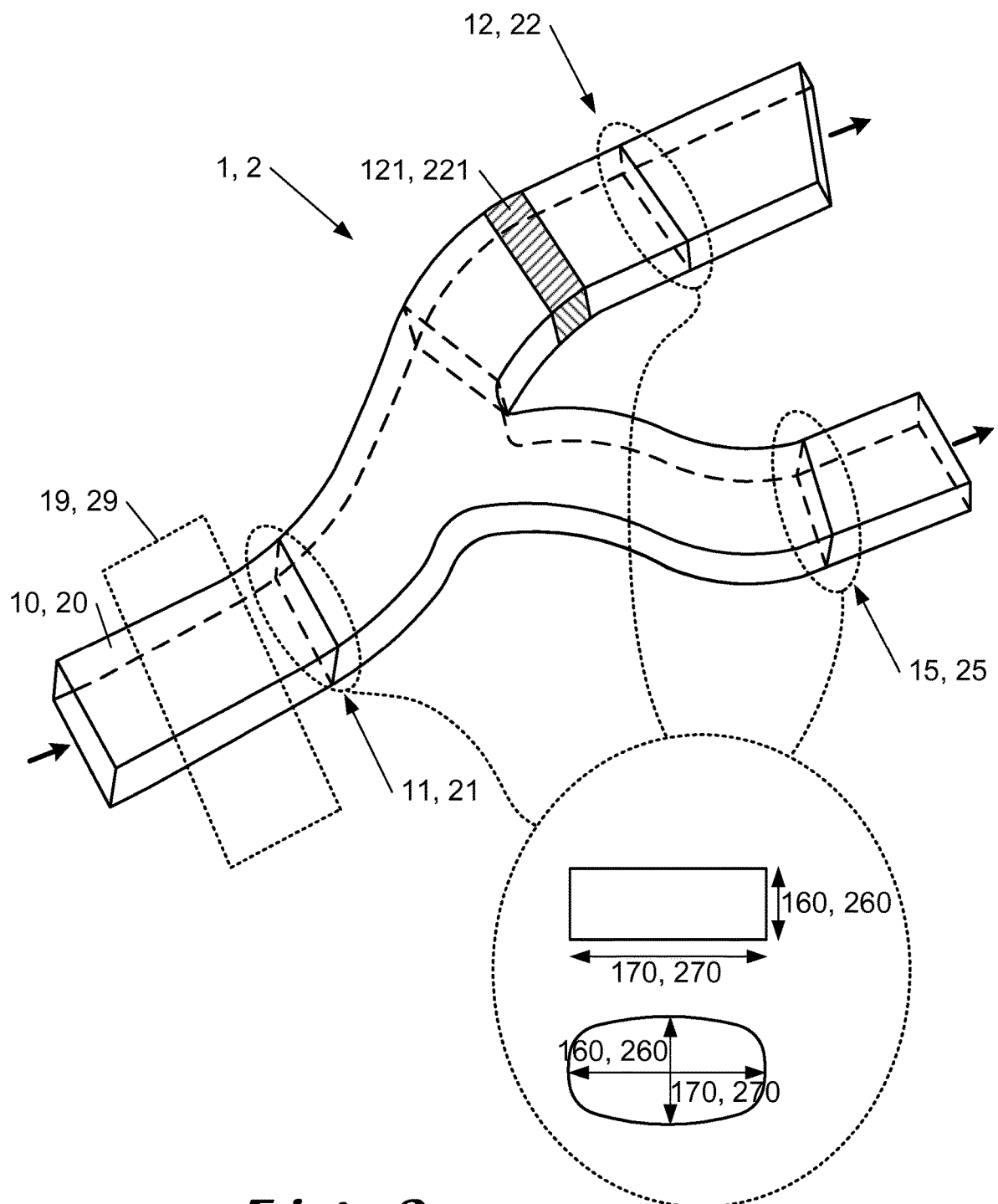
FIG. 2 shows another exemplary embodiment of part of the microfluidic module for droplet sorting and merging of the invention.
Figure 4:
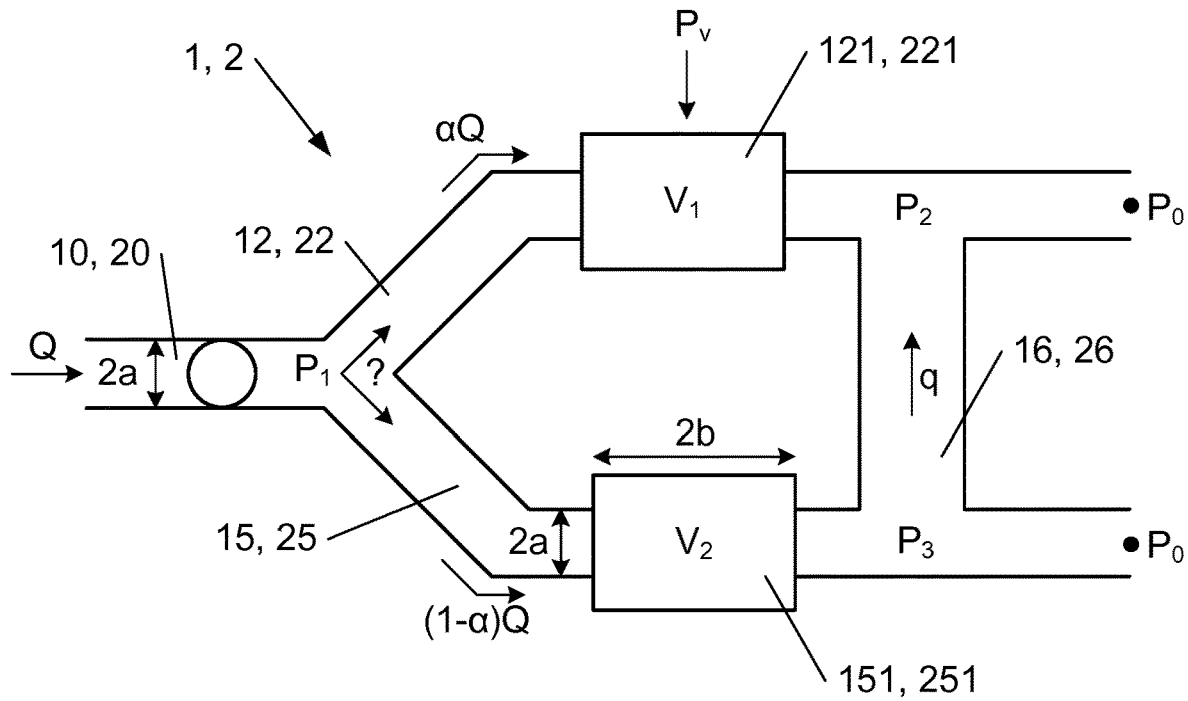
FIG. 4 shows another exemplary embodiment of part of the microfluidic module according to the invention showing physical parameters.

FIG. 2 shows an exemplary embodiment of part of a module 1, 2 of the invention with an inlet 11 (21), a first outlet (12, 22) and a waste outlet channel 15 (25). Said waste outlet 15 (25) is for example identical to said first outlet 12 (22). Preferably portions of said first 12 (22) and waste 15 (25) outlets are symmetrical to each other's as shown in FIG. 4, 7 or 8b. Preferably the first 12 (22) and waste 15 (25) outlets are connected to the inlet channel 11 (21) at a common junction. The channels 11, 12, 15 (21, 22, 25) can form for example a Y-junction meaning they have a Y configuration. In order to manipulate droplets on the basis of the observation done from the detection portion 19 (29).

The fluid goes from the inlet channel 11 (21), to the first outlet channel 12 (22) and/or to the first waste outlet 15 (25). The inlet channel 11 (21) has cross-sections perpendicularly to the fluid main direction that are shown by the arrows. The first outlet channel 12 (22) and first waste channel has cross-sections perpendicularly to said fluid main direction. For example, the inlet channel 11 (21) and the first outlet channel 12 (22) have the same cross-sections all along. For example the cross-sections are essentially rectangular. For example, the cross-sections are essentially elliptic. The cross-sections preferably have a height 160, (260) and a width 170, (270). In case of a rectangular cross-section, said height 160, (260) being a rectangle width and said width 170, (270) being a rectangle length. In case of an elliptic cross-section, said height 160, (260) being a minor axis, said width 170, (270) being a major axis. Any other cross-section might be utilized for the invention. Cross-sections with varying width 170, (270) and height 160, (260) along the module channels are possible.

The first and second outlet channels 12 (22), 13 (23) can also be asymmetric, and only one valve could be used, one channel being the default channel (all droplets flow in this channel when the valve is not actuated), whereas the droplets flow in the selection channel when the valve on the default channel is actuated. The number of valves can differ from the number of outlets (according to an appropriate design of the channels).

A module for droplet manipulation 100 can advantageously have more than two outlet channels and or more than one inlet channel. For example such a module 100 can have three outlet channels 12, 13, 15 (22, 23, 25) and one inlet channel 11 (21). For example, such a module can have two inlet channels and two outlet channels. For example the detection portion 19 (29) allows viewing simultaneously droplets that are in two inlet channels. For example such module 100 can have two inlet channels and one outlet channel. Any other configuration of inlet and outlet channels can be contemplated.

Figure 3:
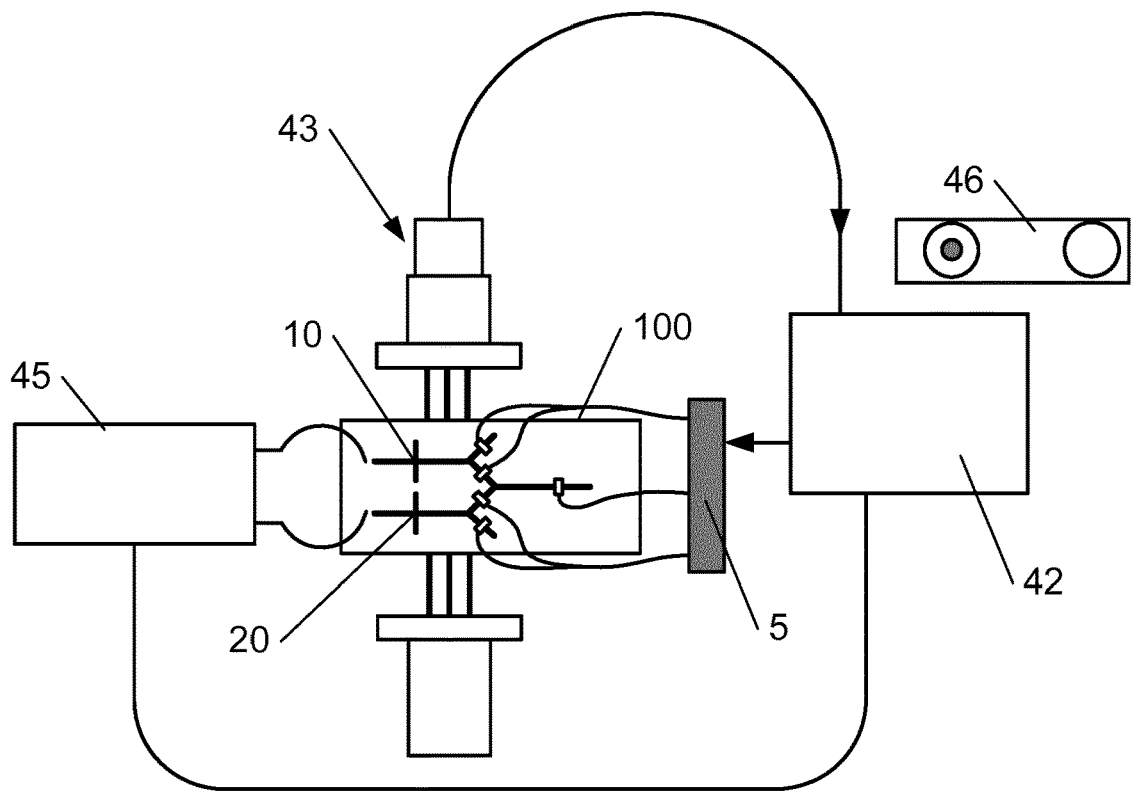
FIG. 3 shows another exemplary embodiment of the microfluidic module for droplet merging according to the invention.

FIG. 3 shows another exemplary embodiment of the module 100 of the invention. A camera 43 is placed, preferably with optical elements such as filters or lenses in order to be able to image a fluid inside the inlet channel 11, 21 from the detection portion 19, 29. Preferably, a light source is placed opposite to the detection portion in order to lighten up the detection portion and to contrast droplets that are passing inside said inlet channel 11, 21. For example the detection portion 19, 29 is transparent on the side of the camera 43 and can for example be translucent on the side of the light source. FIG. 3 shows additionally to the module 100, a module for droplet generation 10, 20 (for example by flow focusing or T-junctions, terms known by the one skilled in the art). The module for droplet generation is for example advantageously associated with a module for content encapsulation in the droplet 10, 20.

For example, the module 100 of the invention with a module for droplet generation and content encapsulation 10, 20 is used to produce water-in-oil droplets. The module for droplet generation 10, 20 is filled with fluids thanks to tubes connected to the chip inlets. The dispersed phase is aqueous-based (pure deionized water, cellular growth medium with suspension of cells for instance). The continuous phase is for example silicone oil or fluorinated oil (in particular: FC-40 Fluorinert, 3M or HFE7500 3M). Surfactant can be used (in one or both phases). A surfactant (for example: PicoSurf, dSurf or FluoSurf) can be used (FC40+2% surfactant or HFE7500+2% surfactant). Other configurations of aqueous and oil phases can be used.

A module for droplet generation and cell encapsulation 10, 20 comprises two primary inlets, one inlet for the continuous phase and another inlet for the droplet/dispersed phase. Continuous and dispersed phase are brought to the two primary inlets using a controlled pumping unit 45 for delivering a controlled amount of both phases. These two primary inlets lead to the inlet channel 1 of the invention. At each primary inlet, either a pressure or a flow rate can be imposed, with pressurized air or syringe pumps respectively. Syringe pumps have been used to set flow rates in said primary inlets. Hamilton glass syringes are preferentially used for their improved friction-less piston motion and for their rigidity compared to other syringes and ability to reproduce desired flow rates.

The fluids are conducted from the syringes to the primary inlets with flexible tubing. In FIG. 5c, it can be seen rounded connection for flexible tubing to connect to an embodiment of the module 100 of the invention. For example, PVC, PTFE, or FEP tubing is used because its flexibility is very convenient for interconnection and because it is adapted to the liquids manipulated mentioned above. For example, the tubing cross section has inner and outer diameters of 1 mm and 2 mm, respectively. The tube is connected to the syringe with a Luer adapter or a syringe needle. The tube is directly fixed in the chip primary inlets.

It can also be seen in FIG. 3 that obstructive valves 121, 151, 221, 251, 311 can be activated independently by a valve controller 5. The valve controller 5 is connected to a pressurized air circuit. Referring to FIG. 3, the valve controller allows delivering a given pressure to each control channel 123, 153, 223, 253, 313 for controlling the deflectable wall 122, 152, 222, 252, 312 of said obstructive valves 121, 151, 221, 251, 311. Preferably, the valve controller 5 is configured to deliver a pressure to said control channel 123, 153, 223, 253, 313 in order to be able to reach an infinity of positions of said deflectable wall 122, 152, 222, 252, 312.

For example, a camera 43 is mounted on a microscope to image the inlet channel 11, 21 of the module 1, 2 of the invention via the detection portion 19, 29. Currently, the acquisition rate of the high-speed camera is limited to about 200 frames per second by the real-time data transfer to the computer. Higher real-time data transfer to the computer is foreseen. A visual inspection is always possible thanks to the microscope ocular, as the camera is mounted on a separate photo-tube. For example, an algorithm is able to track every droplet and to extract its position, length and speed. From there, the passage frequency (droplet throughput) and inter-droplet spacing can be inferred and the pneumatic valve controller 5 can control each deflective valve independently.

Real-time image processing is performed thanks to a camera (interfaced with coaxPress cable to/) and a frame-grabber, allowing high acquisition frame rate (100-1000 f/s, depending on the size of ROI on camera sensor). Image acquisition and processing can be performed with software developed in C++, or LabView, or Java, or Matlab, or Python or any other. Camera can be interfaced with USB3, CoaxPress, GigE, Camera Link, Ethernet or any other. Performance is function of the computer resources, the interfacing cable and of the implementation of the algorithm. Taking advantage of multi-core processor and multi-thread programming increases the throughput.

The co-encapsulation module 100 of the invention requires an algorithm to manage the activation timing of the valves in response to the analysis of the content of the drops. The center of mass of the particles or drops (or both) is detected by image analysis using an image processing unit 42. Their speeds/movements are calculated thanks to the analysis of successive images (tracking). Tracking predicts the position of the particles/drops downstream, and the timing management algorithm triggers the valves 121, 151, 221, 251, 311 in response.

The first steps of the image processing algorithm consist in the binarization to extract the droplets, particles or other moving objects out of the background. This is performed thanks to basic image processing: filtering and morphological operation, mean background calculation and subtraction, and finally thresholding.

Different visualization modes are possible:
  for example, pure fluorescence mode: thanks to filtering, only the fluorescent particles (labelled cells), or fluorescent droplets (thanks to fluorogenic substrate) are captured by the camera sensor 43 on top of the dark background. The fluorescent content is detected thanks to morphological operations (erosion, dilatation, etc.) and thresholding.
  for example, visible mode: a real image of the droplets and their content is acquired by the camera sensor 43 (grayscale, or color). The edges of the droplets can then be detected thanks to background subtraction and eventually morphological operations. The mass center of droplets, their length, spacing and instantaneous speed can be computed. Then their content can be analysed (number, size, morphology etc).
  other modes of visualisation can be used, such as multiple fluorescence, spectroscopy, absorbance, . . .

The image processing unit 42 uses image processing technics such as: contrast enhancement, background subtraction, binarization, and/or segmentation. Other image processing technics can be foreseen such as basic image analysis methods and/or algorithm based on pattern recognition, on experience and/or machine learning.

FIG. 4 shows another exemplary embodiment of part of the module 100. Here, physical parameters are shown, such as the flow rate Q. A flux of flow rate Q going into the inlet channel is divided into first 12, 22 and second 15, 25 outlet channels ($\alpha Q$ going to first outlet channel 12, 22 and $(1-\alpha)Q$ going to second outlet channel 13, 23). A "bypass" channel 16, 26 between first 12, 22 and second 15, 25 outlet channels is positioned after the first 121, 221 and second 151, 251 obstructive valves in order to equilibrate pressures after the obstructive valves 121, 151 and 221, 251, and to make the valve activation independent from the outlets. q is the flux in this channel. $P_0$ is preferably a reservoir pressure or an atmospheric or a reference pressure. $P_1$ is preferably an inlet channel 11, 21 pressure. $P_2$ and $P_3$ are respectively first 12, 22 and second 15, 25 outlet channel pressures. q is for example a residual flow rate that vanishes when pressure $P_2$ and $P_3$ equilibrate.

A typical droplet switching system is represented by a "Y" junction as in FIG. 4, consisting of one inlet channel 11, 21 into which the droplets arrive and two outlet channels 12, 15; 22, 25, each of the outlets being controlled by an obstructive valve 121, 151; 221, 251 superimposed on the outlet channels 12, 15; 22, 25 preferably the valves being activated in alternation. When a valve is deflected, the local resistance in the outlet channel 12, 15; 22, 25 increases. Each obstructive valve 121, 151; 221, 251 acts as a variable resistor (depending on the applied pressure on the deflectable wall 122, 152; 222, 252, supplied by the control channel 123, 153; 223, 253). A "bypass" channel connects the two outlet channels 12, 15; 15, 25, just after the obstructive valves 121, 151; 221, 251. This "bypass" channel, whose hydraulic resistance is dimensioned so as to be negligible with respect to the other elements of the circuit, enables the operation of the obstructive valves 121, 151; 221, 251 and the behaviour of the droplets to be independent of the resistances of the outlet channels 12, 15; 22, 25.

In FIG. 4, when a droplet arrives at the Y-junction, the droplet selects the outlet channel 12, 15; 22, 25 of lower resistance, which is the one in which the obstructive valve 121, 151; 221, 251 is opened. Example in operation are shown in FIG. 7a, b, c and described thereafter.

FIG. 5a shows a cross-section view of an obstructive valve 121, 151, 221, 251, 311 with the deflectable walls 122, 152, 222, 252, 312 being deflected due to an elevated pressure applied to control channel 123, 153, 223, 253, 313. The deflectable wall is deflected toward the inlet or outlet 12, 15, 22, 25, 31 which obstructs said inlet or outlet. Dotted line shows the position of the deflectable wall 122, 152, 222, 252, 312 when the pressure inside the inlet/outlet 12, 15, 22, 25, 31 is equal to the pressure inside said control channel 123, 153, 223, 253, 313. The arrows show the force generated on the deflectable wall 122, 152, 222, 252, 312 when a pressure higher than the pressure in the inlet 12, 15, 22, 25, 31 is applied in respective control channel.

FIG. 5b shows a cross-section view of an obstructive valve 121, 151, 221, 251, 311, with the deflectable wall 122, 152, 222, 252, 312 being not deflected. This cross-section view shows the control channel 123, 153, 223, 253, 313 being perpendicular to the inlet/outlets 12, 15, 22, 25, 31. FIG. 5b shows that the deflectable wall 122, 152, 222, 252, 312 is made of a different piece of material than the control channel and the outlet channel.

FIG. 5c shows a top schematic view of a partial embodiment of the invention, which comprises a module for droplet generation and cell encapsulation 10, 20. It further shows the obstructive valve 121, 151, 221, 251, 311 with its control channel 123, 153, 223, 253, 313 being perpendicular to the inlet/outlets 12, 15, 22, 25, 31. The rounded shapes at the end of each channel are holes for connecting fluid inputs and outputs. These connections are either performed with flexible tube, with syringe tips, metallic hollow parts or fluidic connectors.

FIG. 6 shows steps for fabrication of the obstructive valve 121, 151, 221, 251, 311 and outlet channels 12, 15, 22, 25, 31 of the invention. The fabrication details and description of FIG. 6 are given in the section Preparation of the valves.

FIG. 7a, shows operating pictures of part of said first and second module 1, 2, when a droplet arrives at the Y-junction, the droplet selects the outlet channel 12, 15; 22, 25 of lower resistance, which is the one in which the obstructive valve 121, 151; 221, 251 is opened. This situation is shown in FIG. 7a, which is a top view of the microfluidic module for droplet manipulation. The closed valve appears dark, while the open valve appears clear. Time lapses are shown in seconds in the lower-left corner of each image. The first droplet was slowed down/almost blocked due to the lower valve, while the second droplet is directed into the upper channel with the valve open. Scale bar throughout FIG. 7 is 100 µm.

FIG. 7b shows operating pictures of part of said first and second module 1, 2, when the state of the first 121, 221 and second/waste 151, 251 obstructive valves is reversed at the moment when a droplet is at the junction, the droplet is correctly switched due to the new state of the valves 121, 151; 221, 251. The drop is directed towards the waste outlet 15, 25 that has been opened by the waste obstructive valve 151, 251.

FIG. 7c shows operating pictures of part of said first and second module 1, 2, with a droplet being under the first obstructive valve 121, 221, deflectable wall 122, 222 when said first obstructive valve 121, 221 is activated/deflected. As can be seen in the middle picture corresponding to 0.036, the droplet is not broken and is pushed upstream of said first obstructive valve 121, 221. This can be explained by the deflection of deflectable wall 122, 222 of first obstructive valve 121, 221 that induces a displacement of volume of liquid, distributed between the upstream and the downstream. The droplets upstream of the first obstructive valve 121, 221 therefore undergo a slight recoil upon activation of the valve. It can also be seen on this timeline that the droplet in the second/waste outlet channel 15, 25 resumes its trajectory/velocity once the second/waste obstructive valve 151, 251 is opened.

Experimental characteristic values corresponding to an embodiment of the invention are as follows:
  pressure applied to an obstructive valve 121, 151, 221, 251, 311 by a control channel 123, 153, 223, 253, 313: 1 Bar ($10^5$ Pa);
  total flow through the inlet channel 11, 21 or through first 12, 15 and second/waste 22, 25 outlet channel: 1.1 µL/min ($1.8 \times 10^{-11}$ m$^3$/s);
  time lapse between two switches of the valve state: 50 ms;
  inlet/outlet 11, 21, 12, 15, 22, 25, width (same as valve): 100 µm;
  inlet/outlet 11, 21, 12, 15, 22, 25 height: 34 µm;
  deflectable wall 122, 152, 222, 252, 312 thickness: 12 µm;
  valve 121, 151, 221, 251, 311 length (along outlet trajectory): 300 µm;
  valve 121, 151, 221, 251, 311 resistance: 10 times the resistance of the channel 12, 15, 22, 25, 31 without the valve. ($R_v/R_0 = 10$).

Figure 8A:
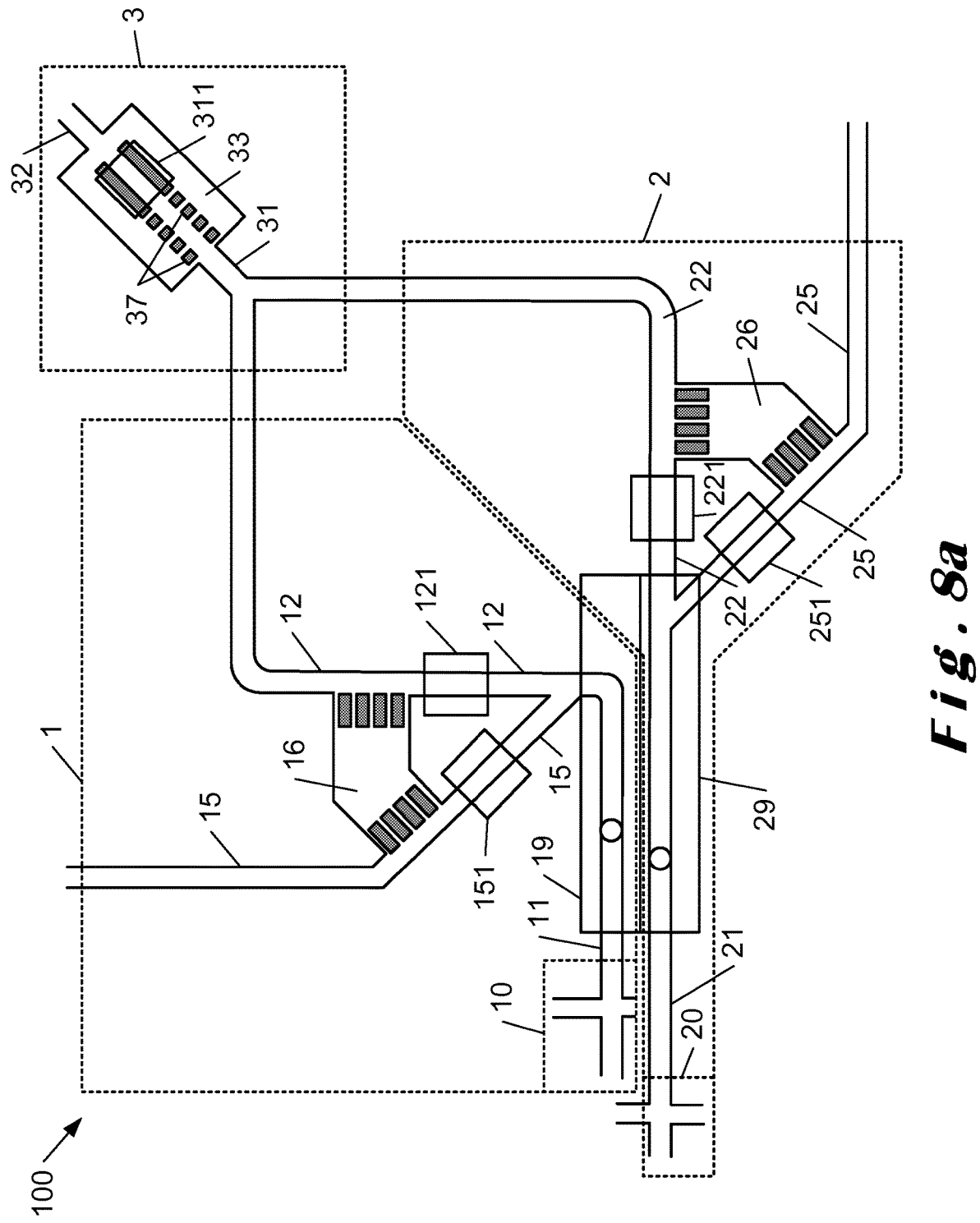
FIG. 8a and FIG. 8b show two exemplary embodiments of the microfluidic module of the invention.
Figure 8B:
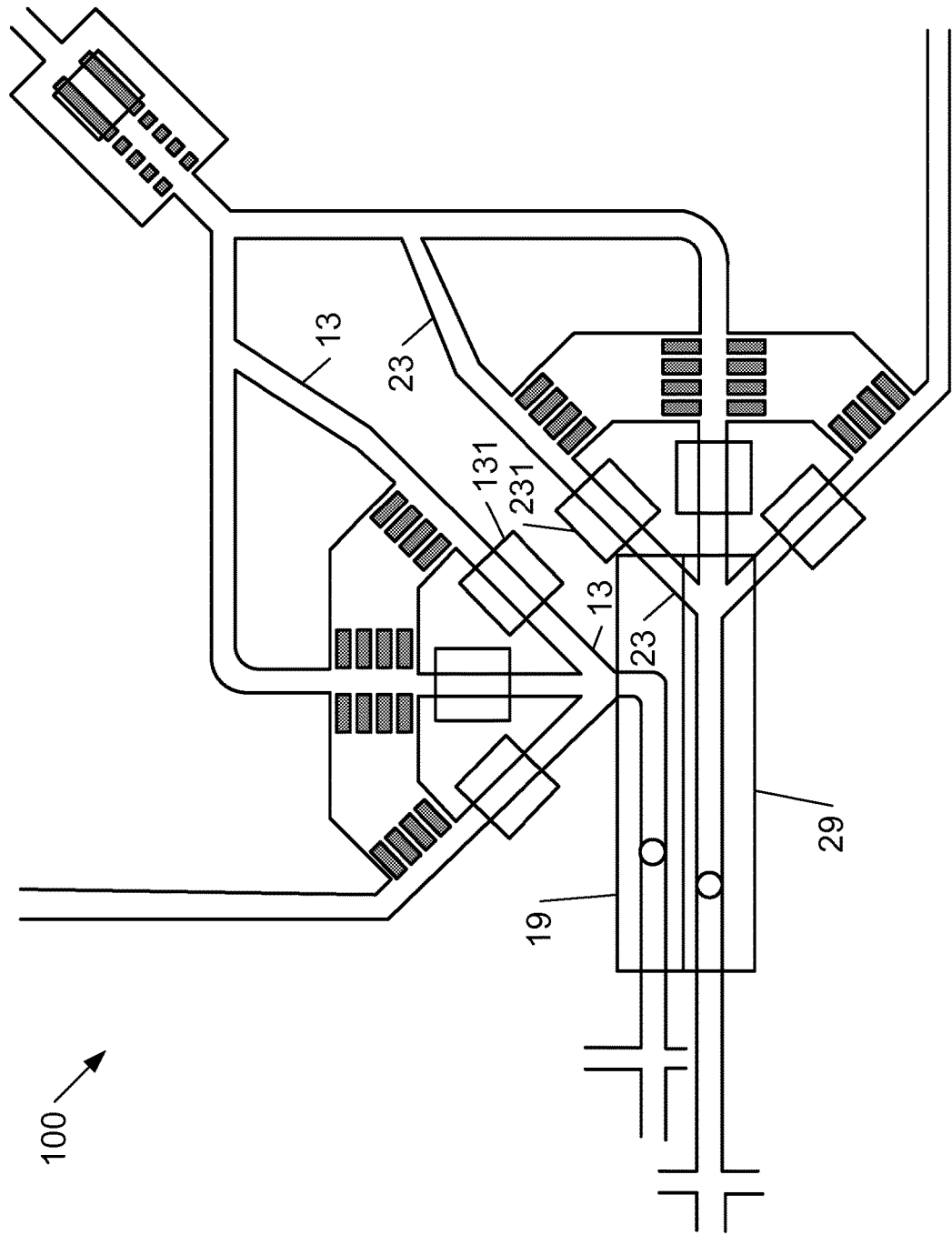

FIG. 8a shows a schematic diagram of an embodiment of the microfluidic module 100 of the invention. The microfluidic device 100 comprises a first module 1, for generating, encapsulating, sorting and providing to the fusion module 3 a droplet of a first population to be merged with another droplet in the fusion module 3. The microfluidic device 100 comprises a second module 2, for generating, encapsulating, sorting and providing to the fusion module 3 a droplet of a second population to merge with another droplet in the fusion module 3. The first 1 and second 2 modules each comprise a generation and encapsulation module 10, 20 able to provide in respective inlets 11, 21, encapsulated droplets of a first and second population respectively. The first 1 and second 2 module inlets 11, 21 respectively each have a detection portion 19, 29 which allows visualizing generated and encapsulated droplets in these inlets 11, 21. The visualization through these detection portions 19, 29 allows to control the obstructive valves 121, 221, 151, 251, and preferably 311. The control of the valves is preferably to allow directing droplets of the first and second populations having desired encapsulated content toward the fusion/merging module 3 in order to co-encapsulate said droplet of first and second populations with desired encapsulated content. To this end, the embodiment of FIG. 8a, comprises a first outlet 12 of the first module 1 in fluid communication with the first module inlet 11 and with the fusion module 3, preferably fusion module inlet 31. The first outlet 12 of the first module 1 allows directing to the fusion module 3, droplets of the first population having the desired encapsulated content. In the case the encapsulated content or the droplet itself does not provide desired properties from the detection portion 19, the droplet is directed to a first waste outlet 15 which is in fluid communication with the first module inlet 11. The first module inlet 11, the first outlet 12 and the waste outlet 15 are fluid connected via a Y junction. A droplet is directed thanks to the obstructive valves positioned on the first outlet 12 and the waste outlet 15. For the second module 2, the description of the first module 1 applies mutatis mutandis.

The first 1 and second 2 modules are connected to the fusion module 3 via their respective first 12, 22 outlets which converge into an fusion module inlet 31. The fusion module 3 comprises an inlet 31 onto which an obstructive valve 311 is positioned. The obstructive valve 311 is closed until a first population droplet and a second population droplet are stopped by the obstructive valve 311. When the two droplets to be fused are touching each other in front of the closed obstructive valve, the obstructive valve 311 is opened and the fusion/merging of these droplets occur. When the two droplets are merged, leading to a co-encapsulation, the co-encapsulating droplet is released and flows to the fusion module outlet 32. In order to optimize the speed and reliability of the fusion module, a bypass in the fusion module is created by providing a way for the continuous phase so that it can freely flow even when the valve 311 is closed. This bypass comprises micro-pillars 37 located along the fusion module inlet 31. The micro-pillars interspacing is lower than a first or second population droplet so that only the continuous phase can flow between the micro-pillars and the droplets can remain confined between the micro-pillars 37 and against the valve 311. Thus the fusion module bypass allows a fluid communication between the inlet 31 and the outlet 32 without passing through the valve 311.

This embodiment of the invention shows a first 1 and second 2 module "bypass", the bypass 16, 26 being a channel connecting their two outputs 12, 15; 22, 25 downstream to said first 121, 221 and second/waste 151, 251 obstructive valves. The bypass 16, 26 preferably have micro-pillars 161, 261 in order to avoid the droplet to flow through the bypass but to allow the continuous phase to flow through the bypass 16, 26. The bypass 16, 26 is preferably suited for allowing pressures downstream said first 121, 221 and second/waste 151, 251 obstructive valves in said first 12, 22 and second/waste 15, 25 outlets to equilibrate. The micro-pillars are preferably aligned along an outlet wall. Preferably the spacing left between the micro-pillars 16, 26 and/or the micro-pillars 161, 261 and the outlet wall is constant. Preferably such spacing has a dimension lower than a first/second population droplet. Preferably a bypass 16, 26 allows bypassing the flow of an outlet to another outlet without an important pressure increase in the microfluidic module 100. It is possible to place a validation channel in fluid communication with said first fusion module outlet 32, the validation channel goes back in the detection portion 19, 29 or to another detection portion that can be versioned by the same camera 43 than detection portions 19, 29. The advantage of having a validation channel which utilizes the same camera 43 than the one for sorting first and second population droplets in first 1 and second 2 modules allows to simplify the design of the microfluidic module 100 and to allow a better control/quality about the droplet sorting output.

For example, the content of each droplet is analyzed by real-time vision using a camera 43 and an image processing unit 42 when a droplet enters the detection portion 19, 29. The image processing unit can make use of a software either on a computer or on a microcontroller. During the time that the droplet passes through the inlet 11, 21 to first or waste outlet, a decision is made by the image processing unit 42 to send the droplet to the first outlet channel 12, 22 or to the second/waste outlet 15, 25. The image processing unit sends a signal to the pneumatic valve controller 5 to control the obstructive valves on the outlets. For example the second/waste outlet 15, 25 is an outlet connected to a waste container in order to collect all droplets which do not exhibit a desired encapsulated content from the detection portion 19, 29 and also to collect the continuous phase for carrying these droplets.

FIG. 8b shows the embodiment of FIG. 8a and one additional outlet 13, 23 for each of said first 1 and second 2 modules. Each of the respective outlets 13, 23 are fluid connected to the respective inlets 11, 21 and to the fusion module inlet 31. Each of the outlet 13, 23 comprise an obstructive valve 131, 231. Preferably these outlets 13, 23 are fluidly connected to the bypass 16, 26 respectively. The bypass connecting the outlets 16, 26 are also separated from the outlets 13, 23 by micro-pillars, as described for FIG. 8a.

Figure 9:
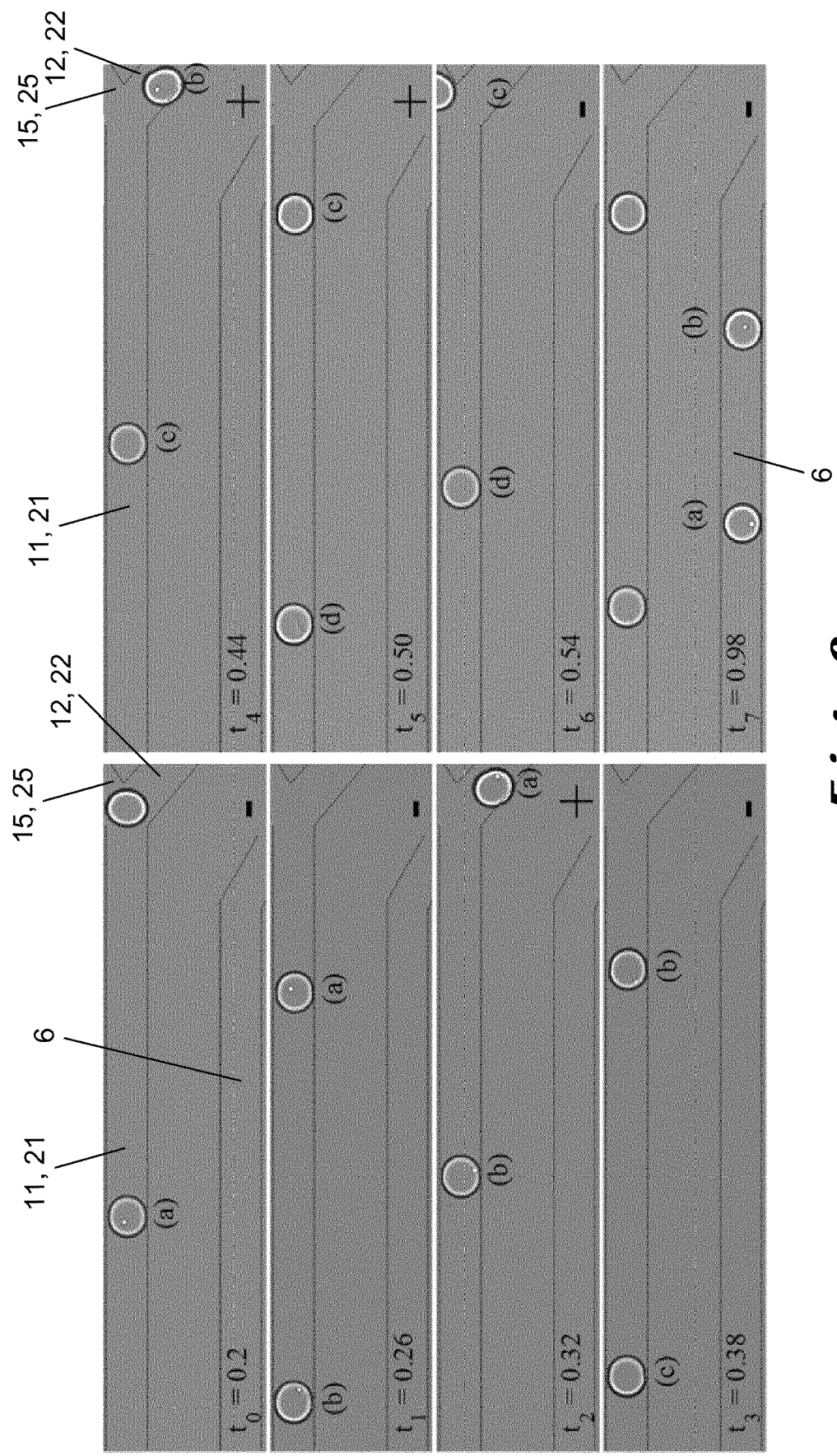
FIG. 9 shows pictures of part of said module detection portion taken at different time interval in order to show the droplet evolution in said module having a validation channel.

FIG. 9 shows pictures of the microfluidic module 100 in operation. These pictures taken at different time intervals show the evolution of droplets coming from the left of the top channel of each picture: the evolution in the top channel of each picture which is the inlet 11, 21 and the bottom channel, a validation channel. These pictures can also be seen as the top channel being the first module inlet 11 and the bottom channel being the second module inlet 21. Therefore these pictures could be seen as showing both first 19 and second 29 detection portions.

FIG. 9 originally shows a Y junction of the inlet 11, 21 with first 12, 22 and second 15, 25 outlets on the top right corner of each picture. The pictures were taken at time $t_0=0.2$ s, $t_1=0.26$ s, $t_2=0.32$ s, $t_3=0.38$ s, $t_4=0.44$ s, $t_5=0.50$ s, $t_6=0.54$ s, $t_7=0.98$ s. Droplets (a), (b), (c) and (d) are displayed for the time intervals just mentioned. Throughout these pictures, it can be seen that droplets (a) and (b) having a content encapsulated are directed to the first outlet 12, 22. Droplet (c) having no content encapsulated is directed to the second/waste outlet 15, 25 due to a change of activation of the first 121, 221 and second 151, 251 obstructive valve by the pneumatic control means 5 activated by the control unit 45 and/or by the image processing unit 42 from an information related to the droplet content viewed in said detection portion 19, 29. The images 46 viewed from said detection portion 19, 29 are for example the images that are displayed in FIG. 9. The images 46 as shown in FIG. 9 contain information of droplets and their content when passing through inlet channel 11, 21 and validation channel 6. The image processing unit 42 is thus able to identify droplet content and to sort any droplet based on its content by directing any droplet to first 12, 22 or second 15, 25 outlet through activation of first 121, 221 or second 151, 251 obstructive valve. The image processing unit 42 analyses the image 46 viewed by a camera 43 in the detecting portion 19, 29. From FIG. 9, it can also be seen that the flow in the inlet channel 11, 21 is split at the junction to first 12, 22 and second/waste 15, 25 outlets thanks to the bypass 16, 26 explained in the description of FIG. 8a, b. The bypass 16, 26 allows flow of the continuous phase to be split in between first outlet 12, 22 and waste outlet 15, 25.

FIGS. 10a, 10b, 10c, 10d and 10e show an embodiment of the fusion module 3 of the invention comprised in said microfluidic module 100. The fusion module 3 is for droplet coalescence/merging. Coalescence or merging of droplets is observed when two successive droplets, a first and a second droplet in a channel can coalesce thanks to the blockage of the first droplet in front of an obstructive valve 311, until the second droplet arrives and coalesces with the first droplet. The embodiment of the fusion module shown in FIGS. 10a to 10e has micro-pillars 37 upstream of the obstructive valve 311. The droplets remain confined between the micro-pillars rows aligned with the fusion module inlet 31 just before the obstructive valve 311 when obstructing or partially obstructing the inlet 311 in order to let pass the continuous phase but not the droplets. The continuous phase can thus flow through the gutters (314) while the droplets are blocked. FIGS. 10a to 10e are schematics of FIGS. 11a to 11e respectively.

Figure 10A:
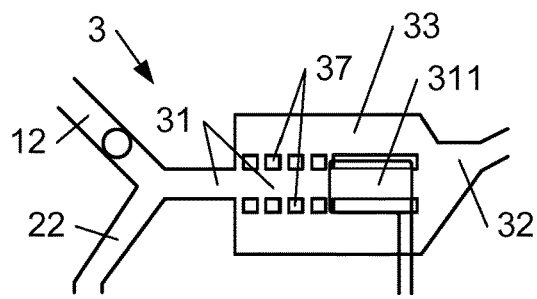
FIG. 10a, b, c, d, and e show exemplary embodiments of the fusion module and showing steps for droplet coalescence/merging.
Figure 11A:
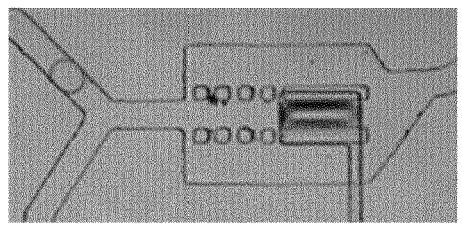
FIG. 11a, b, c, d, and e show pictures of the fusion/merging module according to the invention.

FIGS. 10a and 11a are taken at t=0 ms and show a partially obstructed valve 311 and a first droplet channelled within the outlet of first module 12, 13, which becomes a common outlet of the first module as shown in FIG. 8b or 12.

Figure 10B:
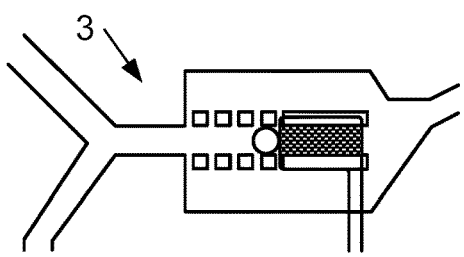
Figure 11B:
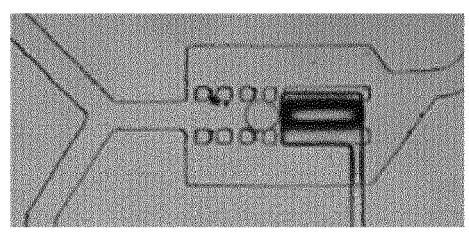

FIGS. 10b and 11b are taken at t=220 ms and show said first droplet blocked by said obstructive valve 311 set into an obstructive regime. The first droplet is in apparent contact with the obstructive valve 311 and in between the two rows of micro-pillars delimiting the fusion inlet 31 laterally.

Figure 10C:
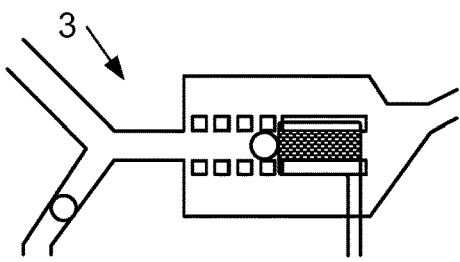
Figure 11C:
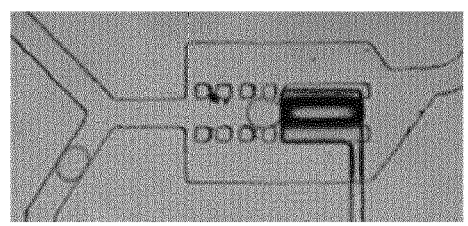

FIGS. 10c and 11c are taken at t=320 ms and show a second droplet channelled inside the outlet of second module 22, 23, which becomes a common outlet of the first module as shown in FIG. 8b or 12. The second droplet is being displaced toward the first droplet immobilized inside said fusion module 3 by said obstructive valve 311. Thanks to the micro-pillar rows in the fusion module 3, the second droplet can be displaced freely and without interacting on the first droplet.

Figure 10D:
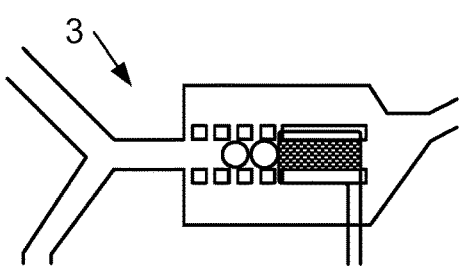
Figure 11D:
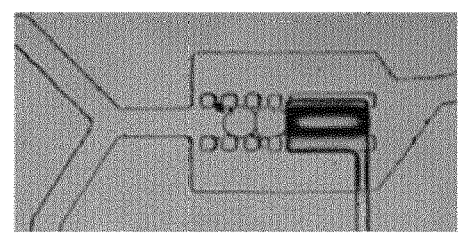

FIGS. 10d and 11d are taken at t=440 ms and show the first and second droplet in contact but not merged/coalesced yet. In this Figure, the obstructive valve 311 is kept closed.

Figure 10E:
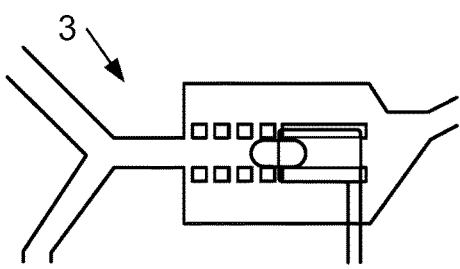
Figure 11E:
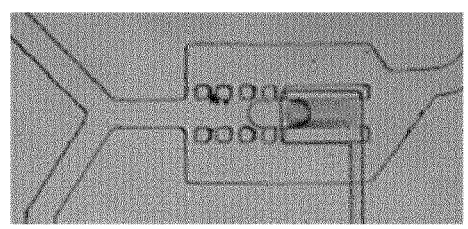

FIGS. 10e and 11e are taken at t=520 ms and show a merged/coalesced droplet containing the first and second droplet content. Coalescence of droplets can occur for example when a first and second droplets enter into contact. Preferably, once the valve 311 opens, the two droplets merge. For example it can be necessary to temporarily increase the pressure inside the channel in order to increase the flow rate and force the droplets to coalesce. The coalesced droplet can be blocked by the partially-closed valve 311 for incubation or for retention. The merged droplet is being sent out of the fusion module by the opening of the fusion obstructive valve 311. A continuous phase flow from the outlet channels 12, 13, 22, 23 allows to push out the merged droplet. Such a continuous flow of continuous phase is for example allowed with the obstructive valves of the outlets closed thanks to the continuous phase flowing through the gutters 124, 154, 224, 254 below the deflectable walls 122, 152, 222, 252 of the partially obstructed valves 121, 151, 221, 251.

The trajectory of the drops that arrive in the fusion structure is constrained by the micro-pillars, while the continuous phase oil is distributed throughout the width of the fusion chamber. The droplets slow down until they are blocked in front of the closed valve 311. The length of the area formed by the micro-pillars makes it possible to store the required number of droplets to be merged. When two droplets are close enough, the valve 311 is opened, causing the droplets to accelerate and merge. Pressure in the control channel 313 of valve 311 is for example 700 mBar for closing. The frequency of droplets arriving at the junction is 20 droplets per second.

FIG. 12 shows said first 1 or second module 2 separately. More than two of such module can be put together to form a microfluidic device able to co-encapsulate more than two population of encapsulating droplets. For example three or four of such modules can be put on a microfluidic chip for co-encapsulation. More outlets can also be foreseen in order for example to allow an incubation time before co-encapsulation. The number of outlets, and thus of immobilization chambers/buffer zones per module 1, 2 can be as large as required, for example three, four, five, six, ten. All the buffered droplets can be released at any time by opening the valves, and sent to the fusion module 3.

FIG. 13 shows pictures of part of an embodiment of the invention. Example of a triple sorting and storage junction of first 1 or second 2 module: only one valve opens at a time, while the other valves are closed. This allows the droplets to be selected in one outlet at a time. $P_{valve}$=700 mbar. Frequency of drops that arrive at the junction of sort=20 drop/s.

FIGS. 13a, 121, 221 and 131, 231 closed, a drop stored in front of each valve. 151, 251 open, the drops pass in the waste outlet 15, 25. t=0 ms;

FIG. 13b, Open 131, 231: the stored droplet is released, and a new droplet to be stored enters the second outlet 13, 23. t=60 ms FIG. 13c, Open 121, 221: the stored droplet is released, and a new droplet to be stored enters the first outlet 12, 22. t=120 ms.

Preparation/fabrication of the valves.

The material used for moulding is polydimethylsiloxane (PDMS), whose properties are: elastomer, transparent, biocompatible, gas permeable (namely oxygen). Any other material or combination of material with at least one of these properties could be used. For example, Poly(methyl methacrylate) (PMMA, also known under the name Plexiglas) with flexible membrane in between two layers (such as Teflon). For example the membrane is not necessarily transparent. Optical information can be obtained from the bottom of the valve. Other parts of said microfluidic module are not necessarily flexible. None of the materials of the microfluidic module must be biocompatible nor gas permeable. Materials properties strongly depend about targeted application.

Two replication masters, fabricated with photolithography are required: one for the replication of the outlet channel layer, one for the replication of the control channel layer. Any other technique for the fabrication of the two masters can be used (laser ablation, micro-milling, micro-machining, additive manufacturing, 3D printing).

The module assembly is made of three layers fabricated separately. PDMS (or moulding material) is prepared with typical proportion of pre-polymer and curing agent (10:1 weight, for Sylgard 184, Dow Corning). It is thoroughly mixed then degassed under vacuum. The duration, temperatures and weight are indicated in brackets for a 10 cm diameter master/wafer.

The first layer, (for example, control channel layer) is cast/moulded on the first master, with 3-5 mm thickness (3.8 mm correspond to 30 g on 10 cm wafer). It is partially cured, until the point at which it is detachable and not sticky (~13 minutes in oven at 85° C.).

During the bake of the first layer, the second layer, which corresponds to the membrane/deflectable wall, is fabricated by spin-coating on a blank wafer, without patterns, for example a silicon or glass wafer. Typically, 2.5 g of PDMS are dispensed, and spin-coated at speeds comprised between 2000 and 5000 rpm in order to get thicknesses comprised between 11.7 mm to 31.3 mm after a 1 hour baking time at 85° C. This second layer is then partially cured until the point at which it is soft but non sticky (~3 minutes and 30 seconds in oven at 85° C.).

The first layer is then carefully unmoulded from first master, cut and then applied with channels face down on the partially cured membrane, channels being facing the membrane. This assembly is baked at least one hour at 85° C. After bake, the assembly consisting of the first layer and the membrane is unmoulded, the membrane remaining attached to the first layer.

The third layer, usually containing channel flows (first 2 and second 3 outlet channels), is moulded on the second master with same thickness as the first layer (3-5 mm). It is then totally cured (1 hour at 85° C.), then unmoulded and cut. This step can be performed in advance (days, weeks) or at the same time as the first layer.

The access holes for inlet 1 and outlet 2, 3 channels and control channel 23, 33 are punched in the third layer (the one that is not attached to the membrane, to avoid any defects on the membrane). All the access (inlets and outlets) should consequently be drawn on the second master, including the one corresponding to the first layer.

The face on membrane side of the assembly of the first and second layers, and the channel face of the third layer are exposed to a corona treatment with corona gun, for forty seconds on each face. Both faces are then aligned and put in contact together, taking care to not introduce air bubbles. Air or oxygen plasma equipment can also be used instead of corona gun.

The complete assembly (3 layers) is then baked again in oven during 1 hour at 85° C. After that, it is ready to be used. It can be laid on a substrate (e.g. glass slide) to provide rigidity, but it does not have to be permanently attached to a substrate. Both layers "flow" and "control" corresponding respectively to inlet 1 and outlet 2, 3 channels can be inverted during the fabrication. Appropriate coating of the channels has to be performed in order to produce the desired emulsion. For example, Aquapel coating for aqueous-in-fluorocarbon oil droplet.

FIG. 6 shows steps for module fabrication according to an embodiment of the invention:

FIG. 6a shows cast master 1 (control);

FIG. 6b shows cast master 2 (flow);

FIG. 6c shows spin-coat blank PDMS membrane;

FIG. 6d shows peel cast 1 and application on membrane;

FIG. 6e shows peel cast 2;

FIG. 6f shows assembly comprising cast 1, membrane and cast 2 flipped.

The present invention has been described with reference to specific embodiments, the purpose of which is purely illustrative, and they are not to be considered limiting in any way. In general, the present invention is not limited to the examples illustrated and/or described in the preceding text. Use of the verbs "comprise", "include", "consist of", or any other variation thereof, including the conjugated forms thereof, shall not be construed in any way to exclude the presence of elements other than those stated. Use of the indefinite article, "a" or "an", or the definite article "the" to introduce an element does not preclude the presence of a plurality of such elements. The reference numbers cited in the claims are not limiting of the scope thereof.

In summary, the invention may also be described as follows. Microfluidic module 100 for co-encapsulation in droplets of two populations of particles, comprising a first 1 and a second 2 modules for sorting said two populations, said modules 1, 2 having their first outlets 12, 22 comprising first obstructive valves 121, 221 configured to at least partially obstruct said first outlets 12, 22, said first outlets 12, 22 being fluidly connected to:
  a fusion module 3 comprising:
    a fusion module means 30 for merging at least one droplet from the first droplet population and at least one droplet from the second droplet population into a merged droplet comprising said two population of particles,
  a control unit 4 for controlling:
    said first obstructive valves 121, 221 from information originating from a first 19 and second 29 module detection portion located upstream of said first outlets 12, 22.

The invention claimed is:

1. Microfluidic module for co-encapsulation in droplets of two populations of particles, comprising:
  a first module comprising:
    a first module inlet for directing a first droplet population and comprising a first module detection portion for detecting said first droplet population inside said first module inlet,
    a first outlet of said first module in fluid communication with said first module inlet, allowing directing said first droplet population along a first outlet trajectory of said first module and comprising a first obstructive valve of said first module configured to at least partially obstruct said first outlet of said first module,
    a first module waste outlet in fluid communication with said first module inlet and with said first outlet of said first module, allowing directing a first population droplet along a first waste trajectory of said first module;
  a second module comprising:
    a second module inlet for directing said second droplet population and comprising a second module detection portion for detecting said second droplet population inside said second module inlet,
    a first outlet of said second module in fluid communication with said second module inlet, allowing directing said second droplet population along a first outlet trajectory of said second module and comprising a first obstructive valve of said second module configured to at least partially obstruct said first outlet of said second module,
    a second module waste outlet in fluid communication with said second module inlet and with said first outlet of said second module, allowing directing a second population droplet along a second module waste trajectory;
  a fusion module comprising:
    a fusion module inlet in fluid communication with said first outlet of said first module and with said first outlet of said second module allowing directing first and second population droplets along a fusion inlet trajectory,
    a fusion module means for merging at least one droplet from the first droplet population and at least one droplet from the second droplet population into a merged droplet,
    a fusion module outlet in fluid communication with said fusion module inlet allowing said merged droplet to be released from said microfluidic module;
  a control unit for controlling:
    said first obstructive valve of said first module from information originating from said first module detection portion,
    said first obstructive valve of said second module from information originating from said second module detection portion.

2. Microfluidic module according to claim 1, wherein said fusion module means is an obstructive valve configured to at least partially obstruct said fusion inlet to stop at least one droplet from the first droplet population and at least one droplet from the second droplet population and for merging said stopped droplets, and wherein said control unit is configured for further controlling:
  said fusion module obstructive valve from information originating from said first and second module detection portions.

3. Microfluidic module according to claim 2, wherein:
said fusion module further comprising a fusion module chamber surrounding at least partially said fusion module inlet and said fusion module obstructive valve, said fusion module chamber and said fusion module inlet being separated by a plurality of micro-pillars to create fluid communications able to drain a droplet carrier fluid of said first and second droplet populations from said fusion module inlet to said fusion module chamber.

4. Microfluidic module according to claim 3, wherein:
said first and second population droplets having first and second droplets diameters;
said plurality of micro-pillars forming a micro-pillar array with micro-pillars being spaced with an inter pillar-spacing being lower than said first and second droplets diameters, preferably, said inter pillar-spacing ranging from 0.1 µm to 1000 µm and even more preferably ranging from 1 µm to 100 µm.

5. Microfluidic module according to claim 2, wherein said first obstructive valve of said first module, said first obstructive valve of said second module, said second obstructive valve of said first module, and said second obstructive valve of said second module are pneumatically actuated obstructive valves, each comprising:
  a control channel;
  a deflectable wall separating said control channels and said outlets;
said deflectable walls being deflectable in response to an elevated pressure in said control channels, said deflectable walls being deflected within said outlets such that said outlets are at least partially obstructed.

6. Microfluidic module according to claim 1, wherein:
said first module further comprising:
  a first generation and encapsulation module for generating first droplets and for encapsulating first particle population into said first generated droplets in order to form a first droplet population to supply to said first module inlet, and;
said second module further comprising:
  a second generation and encapsulation module for generating second droplets and for encapsulating second particle population into said second generated droplets in order to form a second droplet population to supply to said second module inlet.

7. Microfluidic module according to claim 1, wherein:
said first module further comprising:
  a second outlet of said first module in fluid communication with said first module inlet and with said first outlet of said first module, and with said fusion module inlet allowing directing said first droplet population along a second outlet trajectory of said first module toward said fusion module inlet and comprising a second obstructive valve of said first module configured to at least partially obstruct said second outlet of said first module;
said second module further comprising:
  a second outlet of said second module in fluid communication with said second module inlet and with said first outlet of said second module, and with said fusion module inlet allowing directing said second droplet population along a second outlet trajectory of said second module toward said fusion module inlet and comprising a second obstructive valve of said second module configured to at least partially obstruct said second outlet of said second module, and;
said control unit being configured for further controlling:
  said second obstructive valve of said first module from information originating from said first module detection portion,
  said second obstructive valve of said second module from information originating from said second module detection portion.

8. Microfluidic module according to claim 7, wherein:
said first module further comprises a first module lateral channel to form a fluid communication between said first and second outlets of said first module and said first module waste outlet,
said second module further comprises a second module lateral channel to form a fluid communication between said first and second outlet of said second module and said second module waste outlet.

9. Microfluidic module according to claim 7, wherein:
said second outlet and said second obstructive valve of said first module form a second buffer zone for retention of a first population droplet when said valve at least partially obstructs said second outlet of said first module for buffering a first population droplet;
said second outlet and said second obstructive valve of said second module form a second buffer zone for retention of a second population droplet when said valve at least partially obstructs said second outlet of said second module for buffering a second population droplet; and
said control unit is configured for further controlling said second obstructive valve of said first module and said second obstructive valve of said second module for buffering a first or a second population droplet inside said second buffer zone of said first or second module respectively until detection of a droplet of the non-buffered first or second droplet population from said first or second module detection portion.

10. Microfluidic module according to claim 1, wherein:
said first module further comprises a first module lateral channel to form a fluid communication between said first outlet of said first module and said first module waste outlet,
said second module further comprises a second module lateral channel to form a fluid communication between said first outlet of said second module and said second module waste outlet.

11. Microfluidic module according to claim 1, wherein:
said first outlet and said first obstructive valve of said first module form a first buffer zone for retention of a first population droplet when said valve at least partially obstructs said first outlet of said first module for buffering a first population droplet;
said first outlet and said first obstructive valve of said second module form a first buffer zone for retention of a second population droplet when said valve at least partially obstructs said first outlet of said second module for buffering a second population droplet; and
said control unit is configured for further controlling said first obstructive valve of said first module and said first obstructive valve of said second module for buffering a first or a second population droplet inside said first buffer zone of said first or second module respectively until detection of a droplet of the non-buffered first or second droplet population from said first or second module detection portion.

12. Microfluidic module according to claim 11, wherein:

said second outlet and said second obstructive valve of said first module form a second buffer zone for retention of a first population droplet when said valve at least partially obstructs said second outlet of said first module for buffering a first population droplet;

said second outlet and said second obstructive valve of said second module form a second buffer zone for retention of a second population droplet when said valve at least partially obstructs said second outlet of said second module for buffering a second population droplet; and said control unit is configured for further controlling said second obstructive valve of said first module and said second obstructive valve of said second module for buffering a first or a second population droplet inside said second buffer zone of said first or second module respectively until detection of a droplet of the non-buffered first or second droplet population from said first or second module detection portion.

13. Microfluidic module according to claim 1:

said first module waste outlet further comprises a first module waste outlet obstructive valve configured to at least partially obstruct said first module waste outlet;

said second module waste outlet further comprises a second module waste outlet obstructive valve configured to at least partially obstruct said second module waste outlet;

said control unit is configured for further controlling:
  said first module waste outlet obstructive valve from information originating from said first module detection portion,
  said second module waste outlet obstructive valve from information originating from said second module detection portion.

14. Microfluidic module according to claim 1, wherein said first obstructive valve of said first module and said first obstructive valve of said second module are pneumatically actuated obstructive valves, each comprising:
  a control channel;
  a deflectable wall separating said control channels and said outlets;
  said deflectable walls being deflectable in response to an elevated pressure in said control channels, said deflectable walls being deflected within said outlets such that said outlets are at least partially obstructed.

15. Microfluidic module according to claim 1 further comprising:
  pneumatic control means being configured to activate said obstructive valves.

16. Microfluidic module according to claim 1 further comprising:
  a camera for providing a succession of images from said detection portion; and
  an image processing unit for processing said succession of images, said image processing unit being configured to determine real-time position of droplet and/or particle.

17. Microfluidic module according to claim 16, wherein said image processing unit is configured to identify the encapsulated content of a first and/or second population droplet and to discriminate said first and/or second population droplet respectively based on its encapsulated content.

\* \* \* \* \*